United States Patent
Kashimura

(10) Patent No.: US 6,999,218 B2
(45) Date of Patent: Feb. 14, 2006

(54) LIGHT SCANNING APPARATUS AND IMAGE FORMING APPARATUS

(75) Inventor: Hideki Kashimura, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/386,425

(22) Filed: Mar. 13, 2003

(65) Prior Publication Data

US 2004/0057098 A1    Mar. 25, 2004

(30) Foreign Application Priority Data

Sep. 19, 2002    (JP) .............................. 2002-273275

(51) Int. Cl.
    *G02B 26/08*    (2006.01)

(52) U.S. Cl. ...................... 359/216; 359/738; 347/261

(58) Field of Classification Search ........ 359/216–219, 359/738–740; 250/234–236; 347/256–261

See application file for complete search history.

(56) References Cited

U.S. PATENT DOCUMENTS

| 5,793,515 A * | 8/1998 | Sekikawa ................... 359/216 |
| 6,185,029 B1 * | 2/2001 | Ishihara ..................... 359/216 |
| 2001/0012043 A1 * | 8/2001 | Yamawaki et al. |
| 2002/0018112 A1 * | 2/2002 | Nishiguchi et al. |

FOREIGN PATENT DOCUMENTS

| JP | A 8-171069 | 7/1996 |
| JP | A 9-96769 | 4/1997 |
| JP | A 11-218702 | 8/1999 |

\* cited by examiner

*Primary Examiner*—James Phan
(74) *Attorney, Agent, or Firm*—Oliff & Berridge, PLC

(57) ABSTRACT

A width in a main scanning direction of a laser beam is decreased in the outside of an effective scanning region in such a manner that the width along the main scanning direction of the laser beam is restricted by an aperture portion of an aperture member. As a result, so-called flare light is prevented from generating, and a uniformity of light quantity is improved. Namely, in a light scanning apparatus adopting an overfilled optical system, a light scanning apparatus which can prevent degradation of image quality due to flare light is obtained.

22 Claims, 18 Drawing Sheets

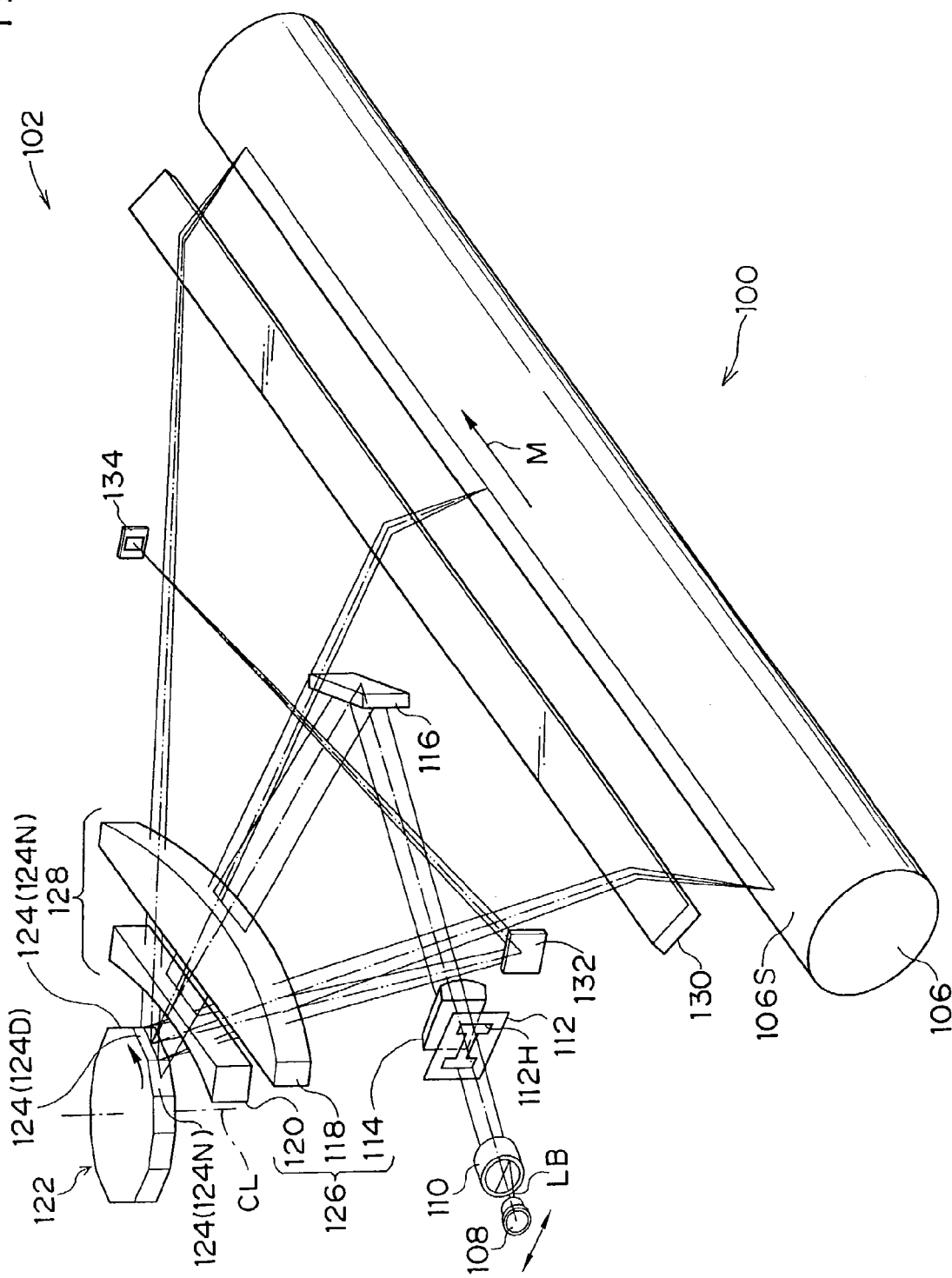

EOS SCANNING LIGHT (LB)

EFFECTIVE RECORDING WIDTH

- --×-- ABSENCE OF ERROR
- --●-- ERROR IS 2 DEGREES BEFORE ADJUSTMENT
- ——■—— ERROR IS 2 DEGREES AFTER ADJUSTMENT

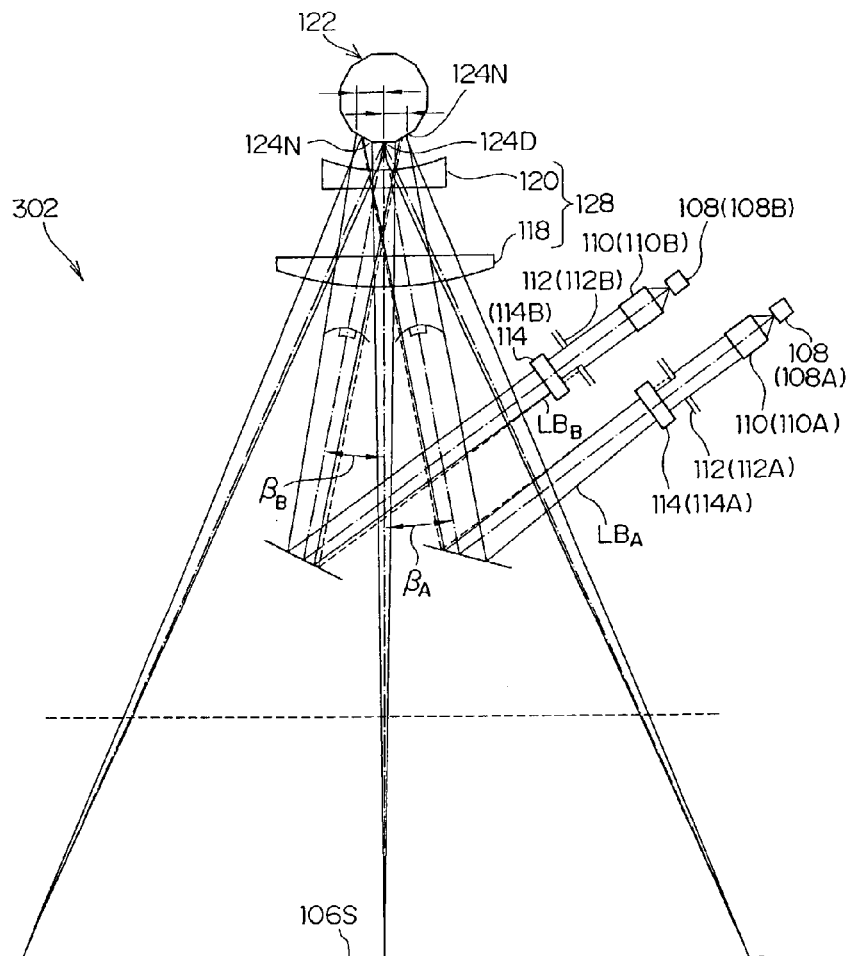
FIG.10A
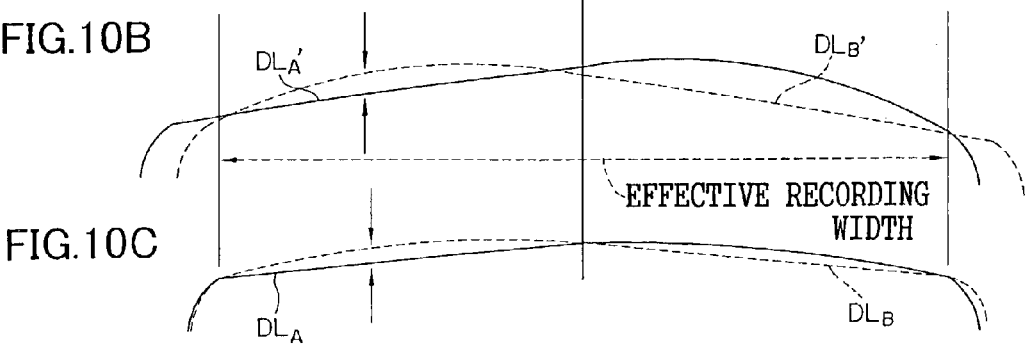
FIG.10B
FIG.10C

LIGHT SCANNING APPARATUS AND IMAGE FORMING APPARATUS

BACKGROUND OF THE INVENTION

1. Field of the Invention

The present invention relates to a light scanning apparatus and an image forming apparatus.

2. Description of the Related Art

In recent years, in the image forming apparatus such as a laser beam printer or a digital copying machine, a so-called overfilled optical system, in which light flux having a larger width in a main scanning direction than a reflection face of a polygon mirror (rotating polygon mirror) of a light deflector in incident on the polygon mirror, dimensions of the reflection face is decreased, and the number of reflection faces is increased to be scanned, has been realized in accordance with a demand for higher speed and density of the image formation. However, in a scanning optical system using the overfilled optical system, because the scanning is performed by using a light beam of which light quantity, typified by Gaussian distribution, varies according to a position of a face being scanned, there is a problem that uniformity of a light quantity distribution is lost. For example, the intensity is high in a central portion of a main scanning line, but the intensity is low in an end portion, and the like.

In order to solve the problem, Japanese Patent Application Laid-Open (JP-A) No. 11-218702 (Patent Reference 1) has proposed that ununiformity of the light quantity on the face being scanned is corrected by using an aperture in which the width in a direction intersecting a scanning direction is changed in the scanning direction.

FIGS. 13 and 14 show a structure and a principle of a light scanning apparatus described in JP-A No. 11-218702 (Patent Reference 1). In the light scanning apparatus, the light beam irradiated from a light source 12 is condensed by a collimator lens 14, passed through an aperture 17 in which the width in the direction intersecting a rotating direction of a polygon mirror 26 is changed, and focused on a face being scanned 32 through an enlarging optical device 18, the polygon mirror 26, a scanning optical system 24, and a folding mirror 30.

At this point, as shown in FIG. 14, the light beam having light quantity as the Gaussian distribution is made into a state equal to a light beam of which light quantity exhibits a combination of the Gaussian distributions having different peaks, by the aperture 17 in which the width in the direction corresponding to a sub-scanning direction is changed. A part of the light beam whose light light quantity is transformed is reflected by a reflection face 28 of the polygon mirror 26 to be focused on a medium being scanned. Consequently, the light quantities of imaging spots of different positions on the medium being scanned are substantially the same, and the uniform light quantity distribution is formed, as shown in FIG. 15.

Thus, the structure described in JP-A No. 11-218702 (Patent Reference 1) has an effect that a deterioration of the uniformity of the light quantity, which is caused by the overfilled optical system, particularly, the deterioration of the uniformity of the light quantity, which is caused by a decrease in illuminance in the position away from an optical axis (outside axis), can be corrected. However, there is caused a problem that sensitivity for the change in the light quantity distribution is decreased on the face being scanned. For example, when a laser beam has an asymmetric light quantity profile, sometimes alignment of the light beam incident to the rotating polygon mirror or the position in the scanning direction of the aperture portion is adjusted in order to secure the uniformity of the light quantity, in such case, the large amount of the adjustment is required in adjusting. Therefore, a light path is located on the position that is shifted from the design light path, which results in a problem that a beam diameter is enlarged on the face being scanned or the uniformity of the beam diameter is lost.

On the other hand, JP-A No. 9-96769 (Patent Reference 2) discloses an adjusting method, comprising the steps of: detecting a light quantity by a plurality of detectors provided in inside or outside of the light scanning apparatus in a light scanning apparatus using the overfilled optical system; and adjusting the optical axis of a light source apparatus so that the light quantity distribution is uniformed on the basis of a detection value of the light quantity.

In the adjusting method, as shown in FIG. 16, a light source 24 is moved and adjusted so that the intensity of the light beam incident to a light quantity sensor 81 of a scanning start side is substantially equal to the intensity of the light beam incident to a light quantity sensor 84 of a scanning finish side, and the alignment of the light beam is adjusted. Accordingly, a maximum intensity portion of the intensity profile of the laser beam can be corresponded to the optical axis of the optical system, the light quantity of the scanning start end and that of the scanning finish end can be uniformed without losing the uniformity of the beam diameter on the face being scanned. However, the deterioration of the uniformity of the light quantity, caused by the overfilled optical system, and the decrease in the light quantity in both scanning ends, caused by the decrease in the illuminance in the outside axis, can not be prevented.

On the other hand, JP-A No. 8-171069 (Patent Reference 3) discloses that a decrease in light transmittance of the whole optical system and deterioration of the uniformity of the light quantity are suppressed within a certain range, so that such a decrease and deterioration cause no problem in practice, by setting the width of the light flux incident on the reflection face or surface (i.e., the width in the rotating direction of the rotating polygon mirror) 1.5 to 4 times as much as the width of the reflection surface.

However, in the method described in JP-A No. 8-171069 (Patent Reference 3), several problems occurs in the case that the method is adopted for an image forming apparatus in which the higher image quality is demanded.

First, for example, in the case of D0/Fa=1.5, the light flux width on the polygon mirror can not completely cover a deflecting reflection face at a maximum scanning angle, the decrease in the light quantity occurs at both ends of the scanning even in an effective scanning region, and density is decreased.

In the case of D0/Fa=4, the light having the large intensity is also incident on, among a plurality of the reflecting surfaces of the polygon mirror, a reflection face (an adjacent reflection face) adjacent to the reflection face which scans and deflects the light beam. The unnecessary light reflected by the adjacent reflection face is not directly incident to an image region of a recording medium which is being scanned. However, when unnecessary light is reflected by an end face of a lens and the like in the image forming apparatus, the unnecessary light reaches the recording medium with the sufficient intensity enough to expose the medium which is being scanned, and becomes a so-called flare light. The flare light generates a ghost on the face being scanned, and degrades the image quality. Accordingly, new light blocking means is required in order to block the flare light.

Further, as shown in FIG. 17, even if the ratio D0/Fa of the light flux width D0 on the polygon mirror to the scanning direction width Fa of the reflection face of the polygon mirror is set to 4, a ratio of the light quantity at the scanning start position to that at the central position of the scanning does not exceed 90%, and the light quantity of the end portion is decreased by 12%, as compared with the light quantity of the central portion. The amount of the decrease depends on the design of the image forming apparatus. For example, in the image forming apparatus such as a color printer using a lot of half tones, the change in the density is recognizable by eyes, and thus could be a relatively a large obstacle in achieving high quality image.

In order to prevent the decrease in the light quantity, it is thought that the light quantity distribution is corrected by the aperture portion 17 described in JP-A No. 11-218702 (Patent Reference 1).

However, when the light quantity distribution (uniformity) is corrected by the aperture portion 17 described in Patent Reference 1, since the amount of change in alignment for correcting the uniformity of the light quantity caused by the above-described asymmetric profile is increased, the shift of the light path is further increased, and the deterioration of the beam diameter uniformity becomes remarkable.

Thus, in the structure in which the ratio D0/Fa of the light flux width D0 on the polygon mirror to the scanning direction width Fa of the reflection face of the polygon mirror is set in the range of 1.5 to 4, when the structure in which the light beam is passed through the aperture portion is formed so as to correct the ununiformity of the light quantity, a new problem inevitably occurs.

SUMMARY OF THE INVENTION

In view of the foregoing, it is an object of the present invention to obtain a light scanning apparatus that utilizes overfilled optical system and can prevent the degradation, due to flare light, of the image quality, and an image forming apparatus provided with the light scanning apparatus.

In order to achieve the object, the invention has the following characteristics (1) to (8).

(1) A light scanning apparatus comprises: light source means for irradiating a light beam; a first optical system, which shapes the light beam irradiated from the light source means; a rotating polygon mirror which has a plurality of reflection faces that reflect, while the rotating polygon mirror is rotated, the beam shaped by the first optical system, thereby deflection-scanning the light beam; a scanning optical system for focusing the light beam deflection-scanned by the rotating polygon mirror on a face being scanned; and width reducing means for reducing a width in a main scanning direction of the light beam incident to the reflection face, the width of the light beam in the main scanning direction along a direction of the deflection-scanning having been widened larger than the width of the reflection face, by shaping with the first optical system, wherein the width reducing means is configured so as to reduce the width of the light beam in the main scanning direction, in a region outside an effective scanning region.

In the light scanning apparatus, the light beam irradiated from the light source means is shaped by the first optical system, and incident to the reflection face of the rotating polygon mirror. The light beam is deflection-scanned as a result of the rotation of the rotating polygon mirror, and focused on the face being scanned by the scanning optical system. In the light beam incident to the reflection face of the rotating polygon mirror, the width thereof in the main scanning direction along the direction of the deflection scanning of the light beam is wider than the width of the reflection face (so-called overfilled optical system). Accordingly, dimensions of the reflection face can be reduced, and the number of reflection faces of the scanning can be increased.

In the light beam incident to the reflection face of the rotating polygon mirror, the width thereof in the main scanning direction is reduced by the width reducing means. That is, the width of the light beam outside the effective scanning region is reduced in the main scanning direction. Accordingly, the light beam outside the effective scanning region is not carelessly reflected by a reflection face adjacent to the reflection face that is deflection-scanning the light beam, and generation of flare light is prevented. Thus, the degradation of the image quality caused by the flare light can be prevented.

(2) A light scanning apparatus comprises: light source means for irradiating a light beam; a first optical system, which shapes the light beam irradiated from the light source means; a rotating polygon mirror which has a plurality of reflection faces that reflect, while the rotating polygon mirror is rotated, the beam shaped by the first optical system, thereby deflection-scanning the light beam; a scanning optical system, which focuses the light beam deflection-scanned by the rotating polygon mirror on a face being scanned; and width reducing means for reducing a width of the light beam in a main scanning direction of the light beam incident to the reflection face, the width of the light beam in the main scanning direction along a direction of the deflection-scanning having been widened larger than the width of the reflection face, by shaping with the first optical system, wherein, in the width reducing means, a light flux width W in the reflection face, in the direction orthogonal to an optical axis of the scanning optical system in a reflection face, satisfies the following expression;

$$\phi \times \sin(\theta/2 + \pi/n) \leq W \leq \phi \times \sin(2\pi/n) + 0.035 \times f$$

where $\phi$ is a diameter of a circumscribed circle of the rotating polygon mirror, n is the number of faces of the rotating polygon mirror, $\theta$ is a maximum scanning half angle in scanning an effective scanning width in the face being scanned, and f is a focal distance in the main scanning direction in the entire optical system from the light source means to the first optical system, and the width in a sub-scanning direction orthogonal to the direction of the deflection-scanning is adapted to correct a light quantity distribution in the scanning direction on the face being scanned.

In this light scanning apparatus, the light beam irradiated from the light source means is shaped by the first optical system, and incident to the reflection face of the rotating polygon mirror. The light beam is deflection-scanned as a result of rotation of the rotating polygon mirror, and focused on the face being scanned by the scanning optical system. In the light beam incident to the reflection face of the rotating polygon mirror, the width thereof in the main scanning direction along the direction of the deflection scanning of the light beam is wider than the width of the reflection face (so-called overfilled optical system). Accordingly, dimensions of the reflection face can be reduced, and the number of reflection faces of the scanning can be increased.

In the light scanning apparatus, the width in the main scanning direction of the light beam incident to the rotating polygon mirror of the overfilled optical system is set, by the width reducing means, between the width formed by an edge line of deflecting reflection face when the effective recording region is scanned and the width formed by the edge line of the deflecting reflection face when a maximum exposure width is scanned in the case where a positional error at the reflection face of the rotating polygon mirror, caused by the error of the light source means, exists.

Accordingly, the influence which a positional shift of the center of the light source brings on the light quantity distribution, i.e., the ununiformity of the light quantity distribution, can be suppressed in the degree which causes substantially no problem in practice, and the degradation of the image quality, caused by the flare light, can be reduced.

(3) In (1) or (2), the width reducing means is arranged between the light source means and the rotating polygon mirror, and includes an aperture member including an aperture portion, which transmits the light beam.

Thus, the width reducing means in the light scanning apparatus is formed as the aperture member which is provided between the light source means and the rotating polygon mirror. Accordingly, the width reducing means can be formed at low cost without providing a complex/expensive light blocking means.

(4) In (3), the light beam is configured so as to be incident to the reflection face of the rotating polygon mirror, in a scanning plane, at a predetermined angle of inclination with respect to an optical axis of the scanning optical system, the width in the main scanning direction of the aperture portion of the aperture member is asymmetrical to the optical axis of the first optical system, and the width from an optical axis of the first optical system to the aperture portion end face of the rotating polygon mirror incidence side is wider than the contrariness side.

In the light scanning apparatus, even if the light beam is incident to the reflection face of the rotating polygon mirror in a manner inclined at an inclination angle, in a scanning plane, due to the limitation of an optical layout, the maximum light intensity position on the face being scanned can reliably located at the center of the scanning, and the decrease in the light quantity can be corrected in the scanning end portion. That is, the uniformity of the light quantity distribution can be improved.

(5) In (1) to (4), the first optical system includes a coupling optical system, which condenses the light beam irradiated from the light source means, and a first holding member, which holds the light source means and the coupling optical system such that the position of the light source means relative to the coupling optical system is adjustable.

In the light scanning apparatus, by changing the relative position of the light source relative to the coupling optical system, the light quantities of the scanning start end side and the scanning finish end side on the face being scanned is adjustable. Accordingly, even if there are the error of laser intensity profile and the like, the uniformity of the light quantity distribution can be improved without degrading the optical performance.

(6) In (1) to (4), the first optical system includes a coupling optical system, which condenses the light beam irradiated from the light source means, and a second holding member, which holds the light source means and the coupling optical system in an integrated manner such that the light source means and the coupling optical system can be moved integrally.

In the light scanning apparatus, if the light quantities of the scanning start end side and the scanning finish end side on the face being scanned are formed adjustably, an adverse effect due to deterioration of the aberration can be suppressed.

(7) In (5) or (6), the aperture member is located at a position away from an exit pupil of the coupling optical system toward a rotating polygon mirror side, at least by a focal distance of the coupling optical system.

In the light scanning apparatus of the above-described characteristics, when the light quantity difference between the scanning start end side and the scanning finish end side is corrected by positional adjustment of the light source or the coupling lens, adjustment sensitivity can be improved. Even if the ununiformity of the light quantity distribution on the face being scanned, caused by the asymmetry of the intensity profile of the light source and the like, is corrected, since the difference between the theoretical position of light beam and the actual position of the light beam is small, the deterioration of the aberration is small, and the degradation of optical performance such as ununiformity in the beam diameter can be suppressed.

(8) An image forming apparatus comprising the light scanning apparatus described in (1) to (7) and an image carrying body in which the light beam deflection-scanned by the light scanning apparatus is focused on a surface to be scanned to form an image.

In the image forming apparatus having the above-described characteristics, by using the overfilled optical system, image formation at higher speed and with higher density can be realized, and deterioration of the image quality, caused by the flare light, can be prevented. Particularly, in the structure using the light scanning apparatus described in (2), image formation at higher speed and with higher density can be realized as a result of employing the overfilled optical system, and deterioration of the image quality, caused by the change in the density, can be prevented by improving the uniformity of the light quantity distribution.

BRIEF DESCRIPTION OF THE SEVERAL VIEWS OF THE DRAWINGS

FIG. 1 is a perspective view showing a schematic structure of a light scanning apparatus and an image forming apparatus provided with the light scanning apparatus according to a first embodiment of the present invention.

FIG. 5A shows a structure in which an aperture for a light quantity correction is not used, FIG. 5B shows a state in which a center of laser divergence angle is shifted by 2 degrees when a light flux width on a deflecting reflection face is enlarged to 15.3 mm in a light scanning apparatus having a structure using the aperture for the light quantity correction, and FIG. 5C shows a case of the structure of the first embodiment.

FIG. 10A is a perspective view showing a schematic structure of a light scanning apparatus and an image forming apparatus provided with the light scanning apparatus according to a third embodiment of the invention, FIG. 10B is a graph showing the light quantity distribution in the light scanning apparatus having a symmetry-shaped aperture, and FIG. 10C is a graph showing the light quantity distribution in the light scanning apparatus having an asymmetry-shaped aperture.

DETAILED DESCRIPTION OF THE EMBODIMENTS

Preferred embodiments of the present invention will be described below referring to the accompanying drawings. In the following description, specific numerical values and the like are cited only for convenience in describing, and the present invention is not limited to the structures specified by such numerical values and the like.

Figure 2A:
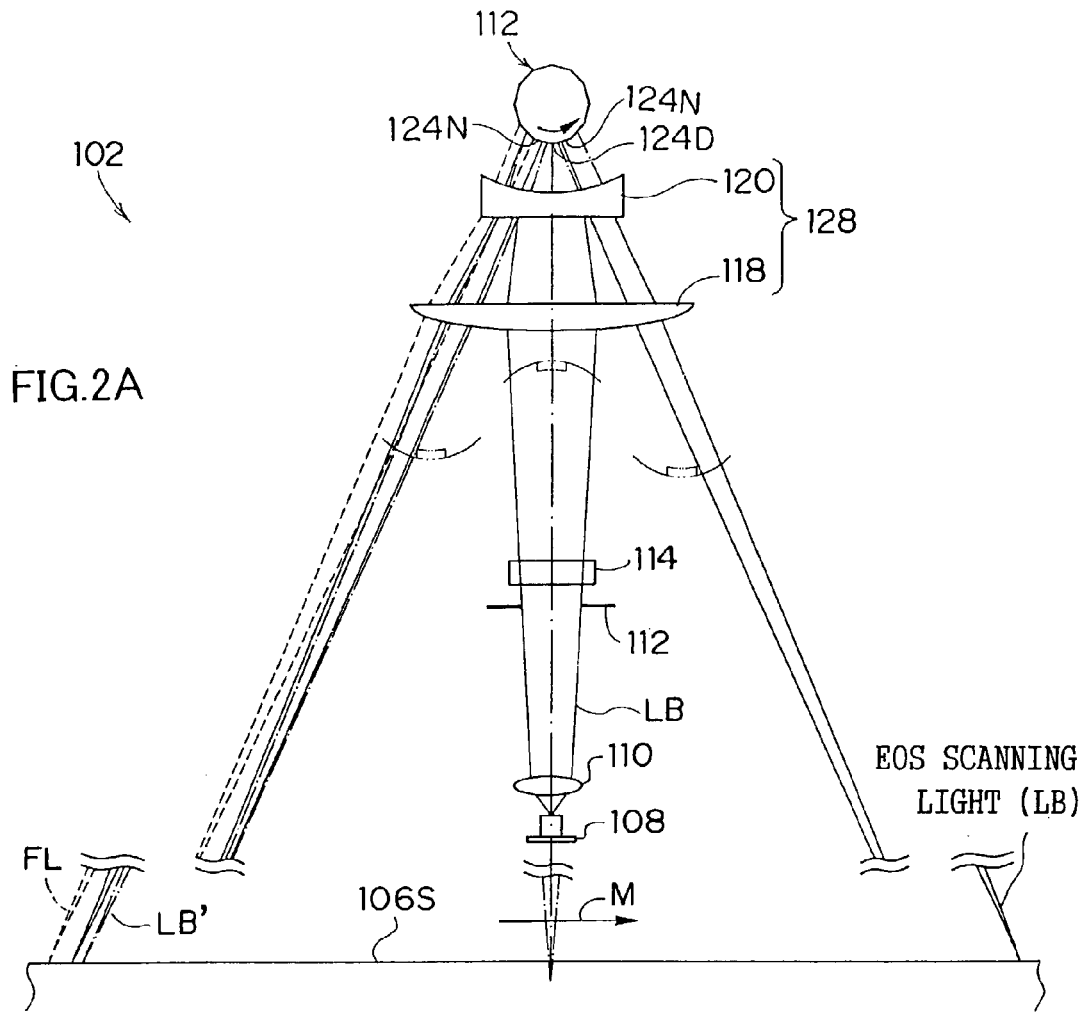
FIG. 2A is a plan view of the schematic structure of the light scanning apparatus according to the first embodiment of the invention, showing a portion of a laser beam in the shape of a line.

FIG. 1 shows a schematic structure of a light scanning apparatus 102 and an image forming apparatus 100 provided with the light scanning apparatus 102 according to a first embodiment of the invention. FIG. 2 shows the light scanning apparatus 102, showing a portion of a laser beam LB in the shape of a line. A light beam in accordance with image information is irradiated from the light scanning apparatus 102, and focused on a surface to be scanned, which is a surface of a photoconductive drum 106 constituting the image forming apparatus 100, for image formation. In this state, the light beam is scanned in a direction of an arrow M (main scanning direction), the photoconductive drum 106 is rotated in a certain direction (sub-scanning direction), and an electrostatic latent image is formed on the photoconductive drum 106. Toner is fixed and developed (visualized) for the electrostatic latent image by developing apparatus which is not shown, and transferred and fixed to an image recording medium (secondary medium) such as paper, whereby a desired image is recorded on the image recording medium. In the following description, the main scanning surface represents a surface formed by the laser beam LB which is reflected and deflected by a rotating polygon mirror 122 described later. Accordingly, the main scanning direction is perpendicular to a rotating axis CL of the rotating polygon mirror 122.

The light scanning apparatus 102 has a laser beam unit 108 irradiating the laser beam LB in accordance with the image information. A coupling lens 110, an aperture member 112, a cylindrical lens 114, and a reflecting mirror 116 are provided in order in a irradiating direction of the laser beam LB from the laser unit 108. In the aperture member 112, as described later, an aperture portion 112H for making light quantity distribution of the laser beam LB uniform is formed. The cylindrical lens 114 has power only in a direction corresponding to the sub-scanning direction. Accordingly, in the laser beam LB, the light quantity distribution is corrected by the aperture member 112. The laser beam LB is then condensed in the direction corresponding to the sub-scanning direction by the cylindrical lens 114, and reflected by the reflecting mirror 116.

A cylindrical lenses 118 and 120 and the rotating polygon mirror (polygon mirror) 122 are arranged in the irradiating direction of the laser beam LB reflected by the reflecting mirror 116. The cylindrical lenses 118 and 120 have power in a direction corresponding to the main scanning direction, makes the laser beam LB substantially parallel light, and makes the laser beam LB incident to the rotating polygon mirror 122.

The rotating polygon mirror 122 is formed in the shape of a flat prism and exhibits a regular polygonal shape (regular dodecagon in the embodiment) in a plan view. Each side face of the rotating polygon mirror 122 is formed as a reflection face 124. The rotating polygon mirror 122 is rotated about the rotating axis CL at a constant angular velocity by rotating drive means which is not shown. Accordingly, while the laser beam LB incident to a specific reflection face 124 (hereinafter the reflection face is referred to as a "deflecting reflection face" 124D, and a reflection face adjacent to the deflecting reflection face 124D is referred to as an "adjacent reflection face" 124N) is reflected by the specific reflection face 124, the deflecting reflection face 124D is moved by the rotation of the rotating polygon mirror 122, whereby the laser beam LB is deflection-scanned along the main scanning direction. As a result of the rotation of the rotating polygon mirror 122, the deflecting reflection face 124D is shifted to an adjacent reflection face in order.

In the embodiment, a first optical system 126 includes the coupling lens 110 and the cylindrical lenses 114, 118, and 120. The first optical system 126 constitutes a so-called overfilled optical system, in which the laser beam LB having a width wider than the width in the direction corresponding to the main scanning direction, of the deflecting reflection face 124D, of the rotating polygon mirror 122 is incident on the deflecting reflection face 124D. This allows the rotating polygon mirror 122 described later to reduce dimensions of the reflection face 124 thereof. Accordingly, the number of faces of the reflection face 124 for scanning can be increased.

In the aperture portion 112H of the aperture member 112, the width (substantial height) in the direction (direction corresponding to the sub-scanning direction) perpendicular to the direction corresponding to the main scanning direction changes along the direction corresponding to the main scanning direction, and the width of both end portions is formed to be enlarged, as compared with a central portion of the main scanning direction. In other words, the width in the sub-scanning direction of the aperture portion 112H changes in accordance with the change in the light flux width of the laser beam LB used with deflection. As a result, the light quantity distribution on a face being scanned 106S is corrected and is made uniform. Hereinafter, the aperture portion, which acts so as to correct the light quantity distribution in the main scanning direction to eliminate ununiformity of light quantity, is referred to an aperture for light quantity distribution correction.

The laser beam LB deflection-scanned by the rotating polygon mirror 122 is incident again to the cylindrical lenses 118 and 120, and the laser beam LB is provided with an image forming function and fθ characteristics to the main scanning direction. Accordingly the cylindrical lenses 118 and 120 constitute not only a scanning optical system 128 in the present invention but also a part of the first optical system 126, and form a so-called double path optical system. This enables a front incidence that is advantageous for improvement of the uniformity of the light quantity distribution in the overfilled optical system. Further, this feature brings about substantially the same effect as is achieved when a collimator lens having the large aperture is arranged. Therefore, in the present embodiment, even if the coupling lens 110 having relatively small diameter is used, the wide light flux can be easily incident to the rotating polygon mirror 122. For example, in the present embodiment, a focal distance of the coupling lens 110 is 12.5 mm, NA is 0.21, and a synthetic focal distance of the cylindrical lenses 118 and 120 is 332.5 mm. Consequently, the synthetic first optical system 126 is equivalent to the collimator lens in which NA is 0.21 and the focal distance is 38.7 mm. In consideration of the cost for manufacturing lens, it is found that the aforementioned feature is very advantageous for cost reduction.

A cylindrical mirror 130 is arranged in the irradiating direction of the laser beam LB. The laser beam LB folded down by the cylindrical mirror 130 is focused on the surface being scanned 106S of the photoconductive drum 106. The cylindrical mirror 130 focuses the laser beam LB on the surface being scanned, thereby effecting image formation. Further, the cylindrical mirror 130 has a function of correcting positional fluctuations on the surface being scanned (function of so-called pyramidal error correction), which is caused by pyramidal error of the plurality of deflecting reflection face 124D.

The two-dimensional image information is written or recorded, as the latent image, as a result of the rotation of the photoconductive drum 106 and the deflection and scanning of the laser beam LB by the rotating polygon mirror 122. The latent image is developed by the developing apparatus which is not shown. Then, the image is formed by transferring the developed image to the secondary medium (usually paper and the like). A photosensitive film for recording and the like may form the face 106S being scanned.

A portion of the light flux deflected and reflected by the rotating polygon mirror 122 has the optical path thereof folded by a reflecting mirror 132, at a scanning start end side outside of an effective scanning region described in detail later, and is incident to a scanning start position detector 134. A scanning start signal is outputted to the control apparatus (not shown) by the scanning start position detector 134, and then on/off operation in accordance with an image signal is started after a predetermined period since the output of the scanning start signal, whereby the image is recorded on the surface being scanned 106S.

In the present invention, the width of the laser beam LB along the main scanning direction is limited by the aperture portion 112H of the aperture member 112 so that the width is reduced in the main scanning direction outside the effective scanning region. This allows preventing the generation of the so-called flare light. This point will be described in detail.

The width along the main scanning direction of the aperture member 112 (hereinafter referred to as "main scanning direction width" as appropriate) is set so as to be a minimum for a required light flux width on the deflecting reflection face 124D of the rotating polygon mirror 122. The required light flux width represents, in a rotation angle of the rotating polygon mirror 122 during the scanning of the effective recording region (e.g., a region of the photoconductive drum 106 on which region substantial image recording is effected), a space between an edge line of the scanning start end side and the edge line of the scanning finish end side of the reflecting reflection face 124D when the deflecting reflection face 124D is moved. Accordingly, the laser beam LB outside the effective scanning region (which laser beam will occasionally be referred to as "laser beam outside the region" hereinafter) does not contribute to the actual image formation, and it is not necessary from the point of view of the image formation. Further, in the overfilled optical system such as the present embodiment, the laser beam outside the region is sometimes incident to the adjacent reflection face 124N of the rotating polygonal mirror. In this case, the laser beam outside the region is diffused as flare light FL inside the image forming apparatus 100. Then, when a portion of the diffused light directly reaches the surface being scanned of the photoconductive drum 106, or when the portion of the diffused light, which has been reflected by another member (a wall surface of a casing and the like which are not shown), reaches the surface being scanned of the photoconductive drum 106, the ghost is generated in the image, which results in the degradation of the image quality. Further, as the photoconductive drum 106 or the developing apparatus (not shown) is generally formed larger than the effective recording width, when the flare light FL caused by the adjacent reflection face 124N reaches the outside of the required recording width, the toner remains in the outside region. The toner in the outside region can not be transferred to the image recording medium, and it remains on the photoconductive drum 106, causing dirt inside the apparatus.

However, in the present embodiment, the above-described generation of the laser beam reaching outside the required recording region is suppressed by properly setting the main scanning direction width of the aperture portion 112H of the aperture member 112. Accordingly, the deflecting reflection face 124D which is deflection-scanning the laser beam LB in that state reflects only the light whose width is equal to or narrower than the effective width of the deflecting reflection face 124D. That is, the intensity of the laser beam outside the effective region is significantly low, as compared with the intensity of the laser beam LB in the effective region. As a result, the generation of the flare light FL is suppressed and the generation of the ghost on the photoconductive drum 106 is also prevented. Further, since the toner does not adhere to the outside of the required recording width, generation of dirt inside the apparatus is also prevented.

Figure 2B:
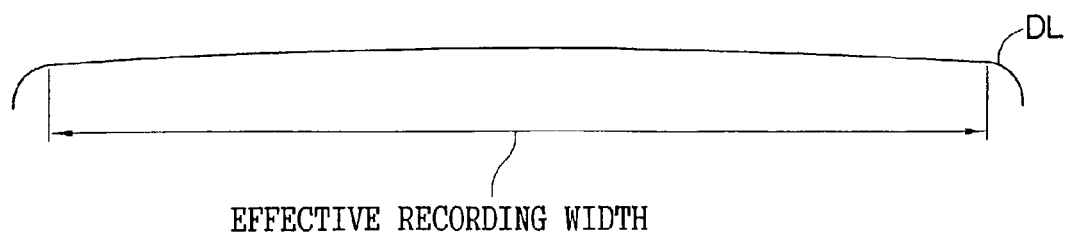
FIG. 2B is a graph showing its light quantity distribution of the laser beam.

The present embodiment uses the overfilled optical system. As shown in FIG. 2, while the laser beam LB is scanned in the neighborhood of a scanning finish end (EOS), the laser beam LB' of the adjacent reflection face 124N is scanned at the scanning start side. However, since the light flux of the laser beam LB is narrow on the deflecting reflection face 124, the laser beam LB' of the adjacent reflection face 124N does not have the sufficient intensity, and it hardly causes the degradation of the image quality. In the case of a so-called imaging exposure, even within the effective recording width, the laser unit 108 is often not lit for a period corresponding to several millimeters of the end portion of the effective recording width. Further, in the region outside the effective recording width, as the reflected light of the adjacent face, which is generated by the lighting during light quantity control or the lighting during the scanning start position detection, further recedes away from the recording width, the intensity of the scanning light is further decreased. As shown by a light quantity distribution curve DL in FIG. 2B, the sufficient light quantity for the image formation can be uniformly secured in the main scanning direction in the effective recording width, and only the light quantity of the low intensity of the degree to which the image quality is not degraded reaches the face being scanned 106S outside the effective recording area. Therefore, the high-quality image can be formed in the required region, without causing the degradation of the image quality as described above.

In the embodiment, as an example, the focal distance of the scanning optical system 128 is 332.5 mm, the rotating polygon mirror 122 is the regular dodecahedron, the diameter of a circumscribed circle of the rotating polygon mirror 122 is 25.882 mm, and the effective recording width is 297 mm. The required light flux width is 12.07 mm. The scanning beam intensity at the region outside the required recording width, namely, outside the effective recording region is reduced by setting the main scanning direction width of the aperture portion 112H of the aperture member 112 at 3.6 mm.

With regards to the aperture member 112, it has been proposed that a light blocking member is separately provided in order to prevent the generation of the flare light FL. In this case, the main scanning direction width of the aperture portion may have a relatively wide width because preventing flare light FL generation is no longer to be considered in designing the aperture potion. However, note that the present embodiment can make a significant contribution to cost reduction, because the present embodiment renders provision of such a light blocking member obsolete.

Figure 3:
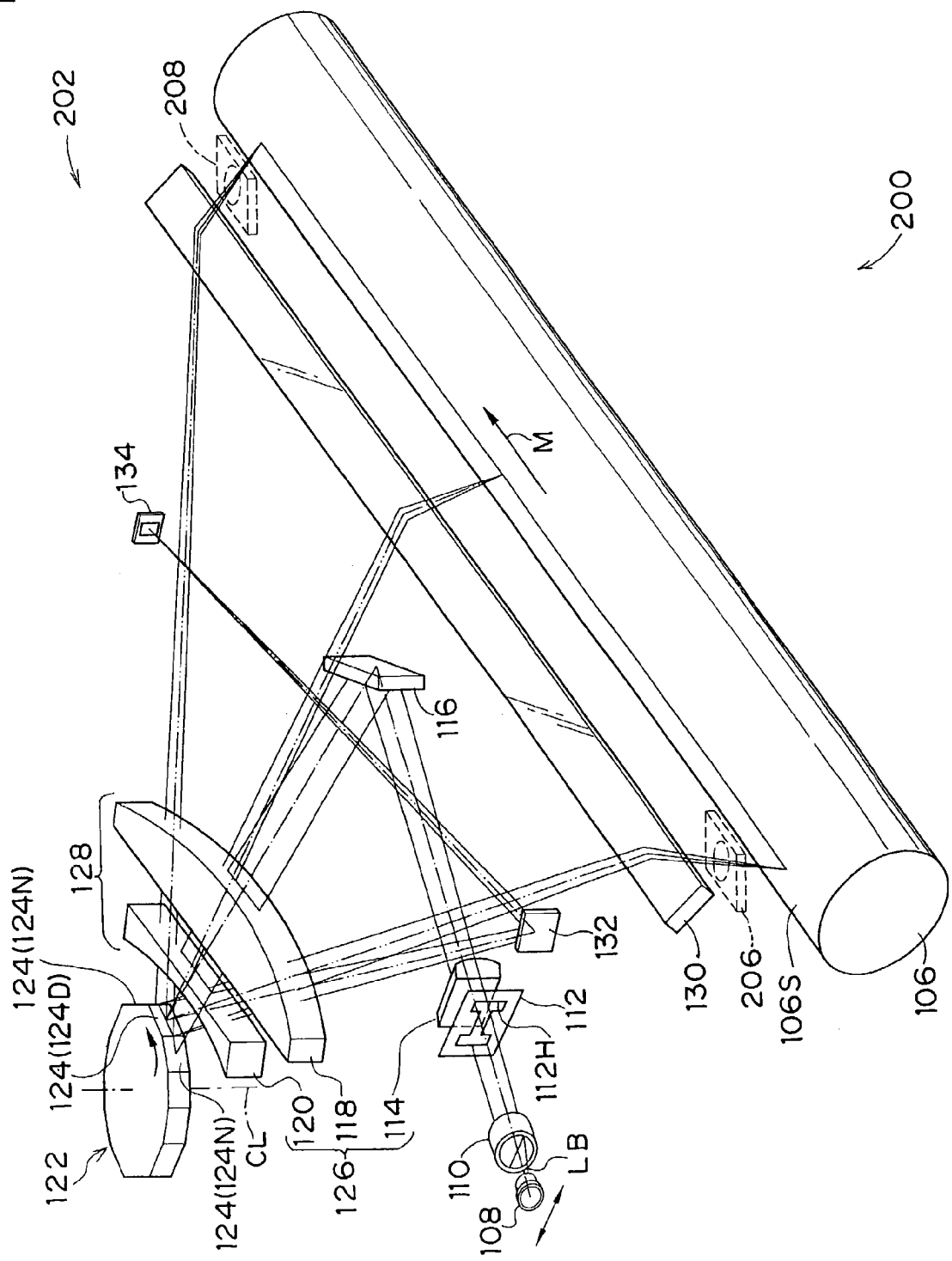
FIG. 3 is a perspective view showing a schematic structure of a light scanning apparatus and an image forming apparatus provided with the light scanning apparatus according to a second embodiment of the invention.
Figure 4A:
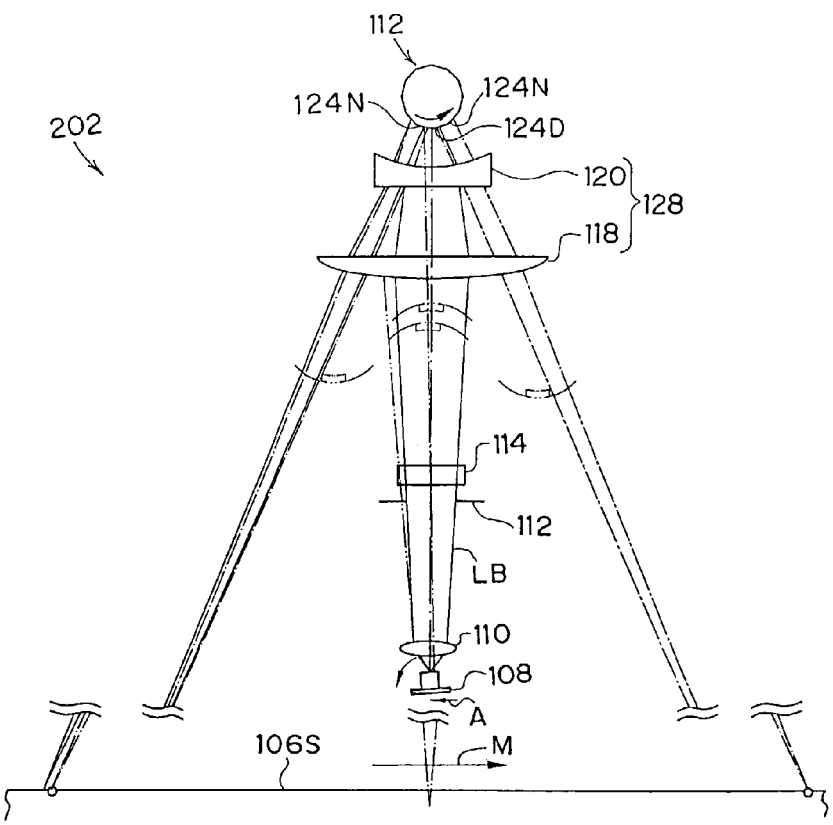
FIG. 4A is a plan view of the schematic structure of the light scanning apparatus according to the second embodiment of the invention, showing a portion of the laser beam in the shape of a line.

A second embodiment of the invention will be described below. FIG. 3 shows a schematic structure of a light scanning apparatus 202 and an image forming apparatus 200 provided with the light scanning apparatus 202 of the second embodiment. FIG. 4 shows the schematic structure of the light scanning apparatus 202 of the second embodiment, and a portion of the laser beam LB in the linear shape.

As an arrangement of each member (optical arrangement) of the light scanning apparatus 202 of the second embodiment is the same as that of the first embodiment, the detail description thereof is omitted, and the same reference numerals and signs are used.

In the second embodiment, where $\phi$ is the diameter of the circumscribed circle of the rotating polygon mirror 122, n is the number of faces of the reflection face 124, $\theta$ is the maximum scanning half angle at which scanning is effected in the effective scanning width in the face being scanned, and f is the focal distance in the scanning direction of the optical system in front of the rotating polygon mirror of the first optical system, then the shape of the aperture portion 112H of the aperture member 112 is set so that the light flux width W of the light flux, which is determined by the aperture portion 112H of the aperture member 112, on the deflection-reflection face 124D in the main scanning direction, satisfies the following expression:

$$\phi \times \sin(\theta/2 + \pi/n) \leq W \leq \phi \times \sin(2\pi/n) + 0.035 \times f$$

The width shown by $\phi \times \sin(\theta/2 + \pi/n)$ is a lower limit value of the light flux width, which can scan the width corresponding to the effective recording region without reducing the light quantity. The width shown by $\phi \times \sin(2\pi/n) + 0.035 \times f$ is an upper limit value of the light flux width, which can scan the maximum scanning width in consideration of a error caused by the center shift of the optical system 126 and the laser unit 108.

The above-described limitations of the light flux width W will be described in detail below by using FIG. 18.

Figure 18:
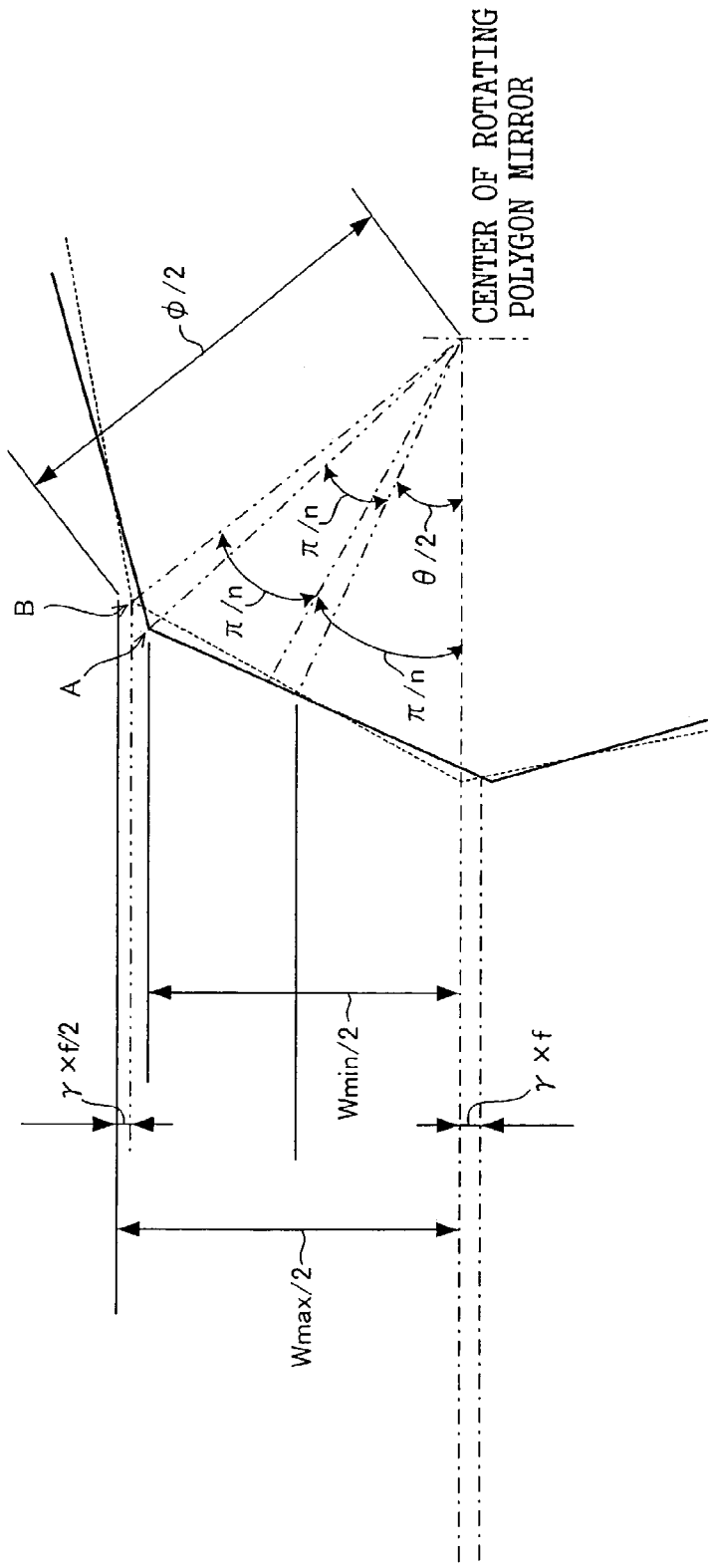
FIG. 18 is an explanatory view showing a light flux width in a main scanning direction in a deflecting reflection face of the light scanning apparatus of the invention.

FIG. 18 shows an edge line position of the rotating polygon mirror 122 and the light flux width in the main scanning direction in the deflecting reflection face 124D. In FIG. 18, the deflection plane is indicated by a solid line when the end portion of the effective recording width is scanned, and the deflection plane is indicated by a broken line when the maximum scanning width is scanned.

Assuming that $\phi$ is a radius of the circumscribed circle of the rotating polygon mirror 122, the edge line of the rotating polygon mirror 122 is located at A position in scanning the end portion of the effective recording width, and a distance from an optical axis at the deflecting reflection face 124D is expressed by $\phi/2 \times \sin(\theta/2 + \pi/n)$.

The edge line of the rotating polygon mirror 122 in the maximum scanning is located at B position, and a distance from an optical axis at the deflecting reflection face 124D is expressed by $\phi/2 \times \sin(2\pi/n)$.

Assuming that f is the focal distance of the first optical system 126, the shift of the intensity center on the deflecting reflection face 124D, which is caused by a center shift $\gamma$ of an intensity profile of light source, is expressed as $\sin(\gamma) \times f$ (and as $\sin(\Delta a) \times f$, when $\gamma$ is $\Delta a$). As described later, it suffices that ½ of $\sin(\gamma) \times f$ is moved on the deflecting face, in order to correct a light quantity difference caused by the shift of the intensity center.

Consequently, by setting a unilateral maximum light flux width of the deflecting reflection face 124D at $W_{max/2} = \phi/2 \times \sin(2\pi/n) + \sin(\gamma) \times f/2$, the light flux width, which corrects the error caused by the center shift of the intensity profile of the light source and sufficiently covers the whole positions or area of the deflecting reflection face 124D in scanning the maximum scanning width, is obtained.

With regards to a value of γ(Δa) which can be used in the overfilled optical system, 2 degrees is generally the upper limit. When an intensity profile shift resulted from γ which is larger than 2 is to be tolerated, it is necessary to further shorten the focal distance of the first optical system 126. However, when the focal distance of the first optical distance 126 is shortened, the light flux width must be decreased on the deflecting reflection face 124D because NA of the coupling lens and laser divergence angle remains within a certain range. That is, the beam diameter can not be made to be within predetermined dimensions, and decrease in the light quantity is significant at both end portions, so that the light beam is no longer suitable for use in an application.

Accordingly, when the maximum value of Δa is set to 2 degrees, sin(γ) becomes 0.035, and it is desirable that the light flux width on the deflecting reflection face is set within the following range:

$$\Phi \times \sin(\theta/2 + \pi/n) \leq W \leq \Phi \times \sin(2\pi/n) + 0.035 \times f$$

In the present embodiment, the main scanning direction width of the aperture portion 112H of the aperture member 112 is 4.2 mm, and the light flux width on the deflecting reflection face 124 is 12.86 mm.

Figure 4B:
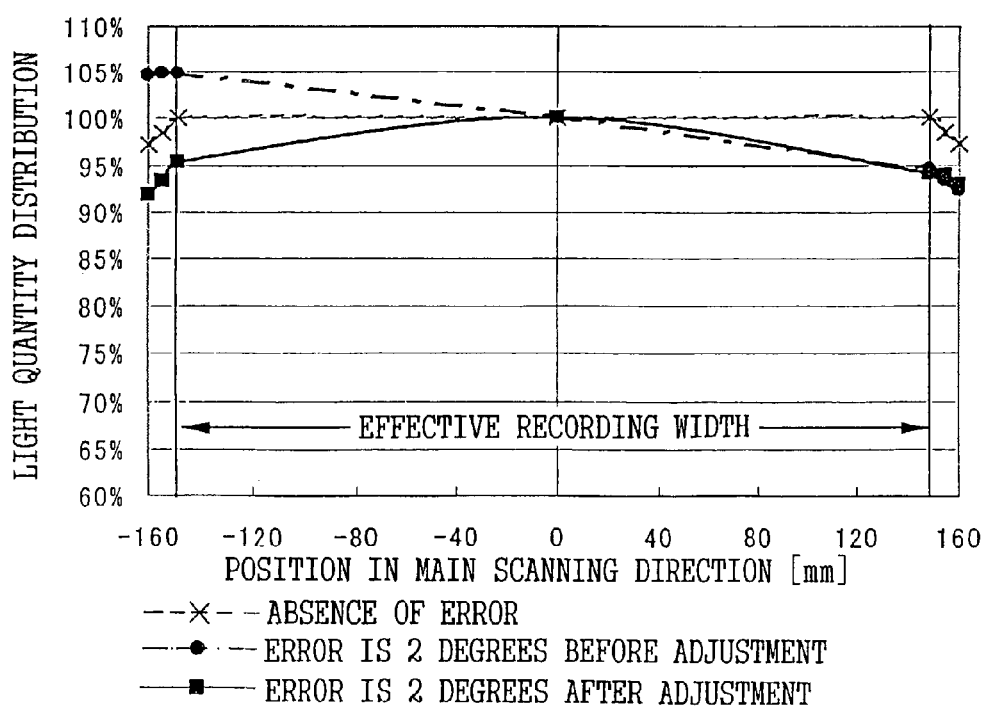
FIG. 4B is a graph showing its light quantity distribution of the laser beam.

In order that the width of the aperture portion 112H in the sub-scanning direction (the direction perpendicular to the deflection scanning direction of the aperture portion 112H) is changed so as to correct the light quantity distribution in the scanning direction on the face being scanned, the correction aperture of the light quantity distribution is set such that the sub-scanning direction width of the aperture portion 112H is set at 2 mm at the central portion and 3 mm at both end portions. This enables the substantially uniform light quantity distribution to be formed in the effective recording width of the medium being scanned (the light quantity distribution shown as "ABSENCE OF ERROR" in FIG. 4B represents this feature).

The operation of the invention will be described in detail below.

Influence caused by the shift of the center of the laser unit 108 of the light source and the light axis adjusting means will now first be described.

Generally, the positional shift in the main scanning direction of the laser beam LB generates the shift between the center of the light quantity on the deflecting reflection face 124D, which is a substantial diaphragm in the overfilled optical system, and the light axis of the cylindrical lenses 118 and 120. In the overfilled optical system, the deflecting reflection face 124D, which is rotated and moved, reflects and scans a portion of the laser beam LB having a given light quantity on the deflecting face. The shift of the center of the light quantity result in loss of symmetry between the light quantitys at the scanning start side and the light quantity at the scanning finish side. As a result, ununiformity of the light quantity distribution on the face being scanned, namely, failure of power balance between the scanning start end and the scanning finish end occurs, whereby difference in density in the image quality is generated.

In the present embodiment, as shown in FIG. 3, in order to prevent the generation of difference in density in the image quality, a scanning start side sensor 206 and a scanning finish side sensor 208 are provided in the outside of the scanning region. Consequently, the laser unit 108 can be adjustably moved in the main scanning direction on the basis of the light quantity measured by those sensors 206 and 208, so that the light quantity distribution is substantially uniform on the face being scanned. The adjusting method will be described referring to graphs in FIGS. 5A to 5C. Each graph shows a relationship between the amount of adjustment of the laser and relative light quantity on the face being scanned at the scanning start end side and the scanning finish end side, respectively. Values in the vertical axis of each graph represent the light quantity (dimensionless), determined as relative values with respect to the light quantity of the laser beam irradiated from the laser unit 108 being 100.

Figure 7A:
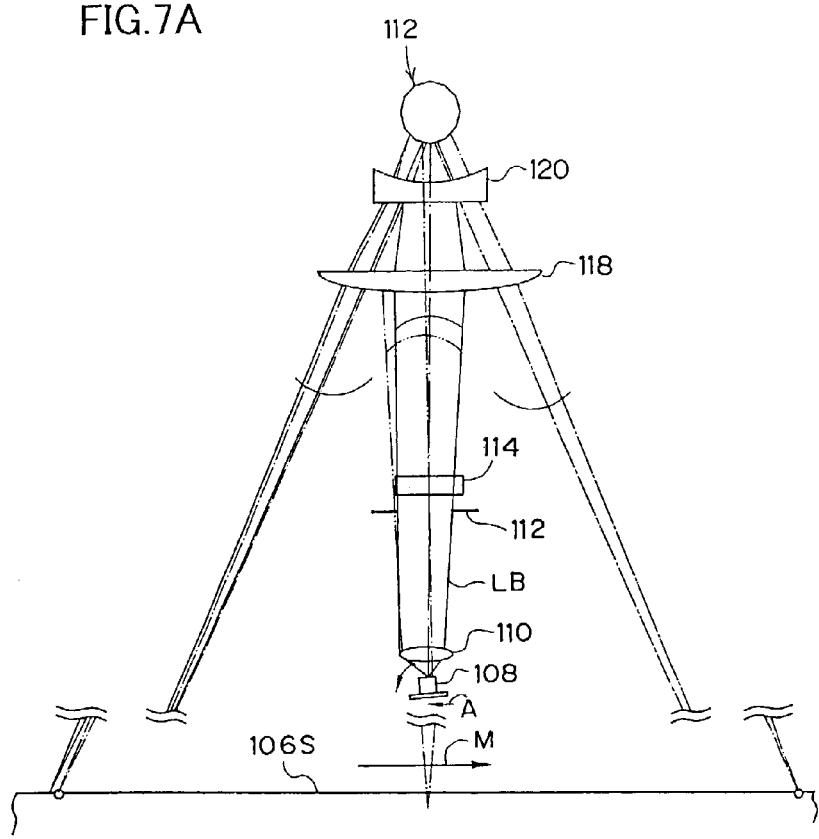
FIG. 7A is a plan view of a schematic structure of a light scanning apparatus having no aperture for correcting the light quantity distribution, shown for comparison.
Figure 7B:
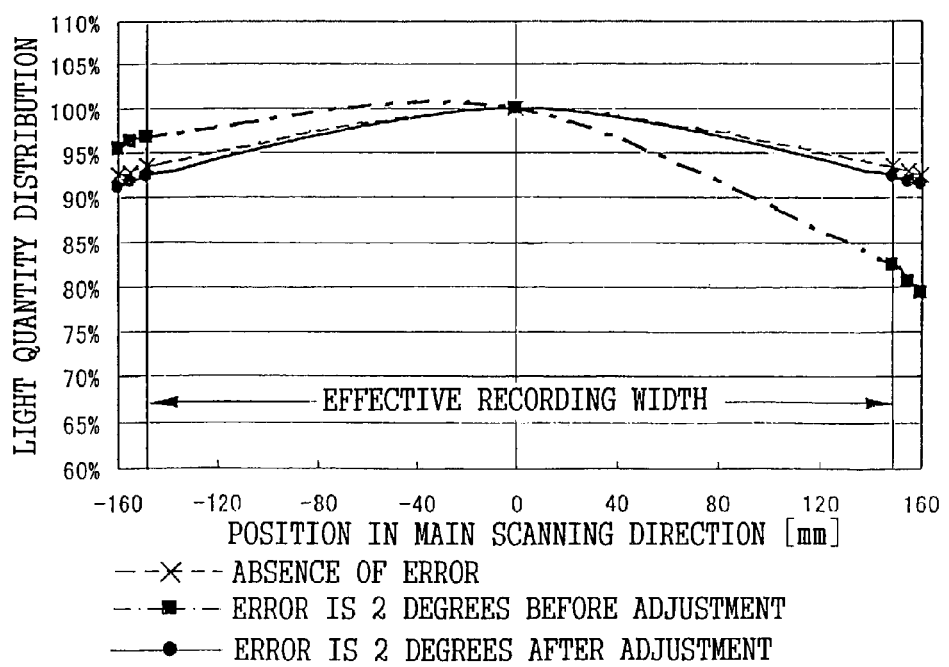
FIG. 7B is a graph showing the light quantity distribution thereof.

FIG. 7A shows the light scanning apparatus having a structure in which the above-described aperture for correcting the light quantity distribution is not provided as the aperture member (for example, a structure in which the rectangular aperture portion is simply formed or a structure in which the aperture member 112 is not formed). FIG. 7B shows the light quantity distribution on the face being scanned, which is formed by the light scanning apparatus of FIG. 7A. In the case that the laser unit 108 is rotated in a counterclockwise direction on the same plane as the paper of FIG. 7, or in the case that the center of laser divergence angle is shifted, the center of the light quantity of the laser beam LB is shifted, as shown by an alternate long and short dash line. At this point, the center of the light quantity is shifted to a left side of FIG. 7A on the deflecting reflection face, and the light quantity distribution becomes larger on the scanning start end side (left-hand side) than the scanning finish end side (right-hand side). Consequently, the light quantity distribution shown by the alternate long and short dash line in FIG. 7B is obtained on the face being scanned.

The light quantity distribution shown in FIG. 7B by the alternate long and short dashed line is detected by the scanning start side sensor 206 and the scanning finish side sensor 208, respectively, and the results from each sensor are compared with each other. The laser unit 108 is adjustingly shifted (by rotating, sliding, or the like) in the direction of an arrow A, whereby the light quantity distribution shown by the solid line in FIG. 7B can be obtained.

In FIG. 7B, the light quantity distribution in a state in which the error is eliminated is shown by a broken line for reference. As can be seen from FIG. 7B, in the case of the light quantity distribution without the error, the light quantity is high at the center of the scanning width and exhibits a relative light quantity of 93% at both ends of the effective scanning width. In the case of the light quantity distribution in which the shift of the center of the laser divergence angle has been corrected, the light quantity distribution thereof exhibits substantially the same light quantity distribution curve as that of the light quantity distribution without the error.

Figure 5A:
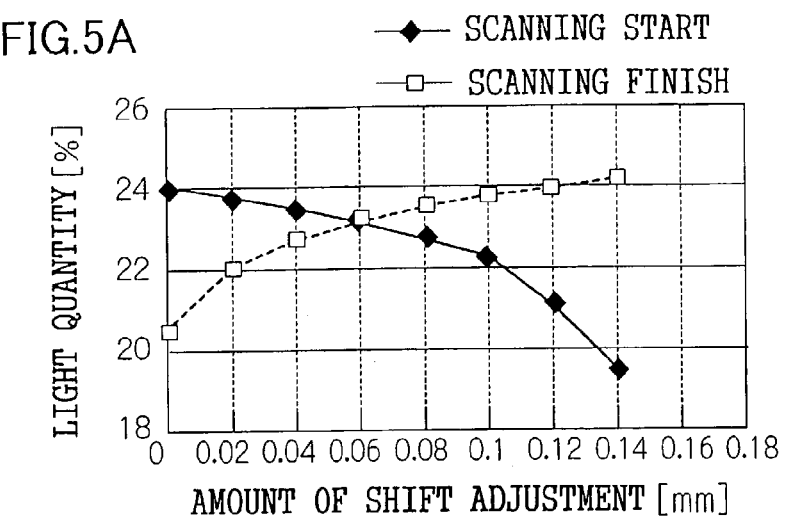
FIGS. 5A to 5C are a graph showing relationship between the amount of adjustment of a laser and relative light quantity on a face being scanned, at a scanning start end side and a scanning finish end side, respectively.

FIG. 5A shows the light quantity at the scanning start end and the scanning finish end, when the center of the divergence angle of the laser beam LB is shifted by 2 degrees, in the structure in which the aperture for correcting the light quantity distribution is not used. At this point, since the first optical system 126 constitutes the collimate optical system, the first optical system 126 is shifted by a value of a sine of the center shift multiplied by the synthetic focal distance of the first optical system 126 on the deflecting reflection face. Specifically, for example, when the first optical system 126 is shifted by about 1.3 mm on the deflecting reflection face in the present embodiment, as can be seen from FIG. 5A, the light quantity distributions at the scanning start end and the scanning finish end can be made uniform by adjustably moving the laser unit 108 by about 0.065 mm relative to the shift on the deflecting reflection face. In this case, the relative light quantity (the light quantities at the scanning start end and the scanning finish end relative to the light quantity at the central portion of the scanning) is about 92%, as shown in FIG. 7B.

However, when the aperture for correcting the light quantity distribution is adapted to the aperture portion 112H of the aperture member 112, the amount of the adjustment of the laser unit 108 is significantly different from the amount of the adjustment of the laser unit 108 shown in FIG. 5A, depending on the width in the main scanning direction of the laser beam LB. As a result, the uniformity of the diameter of the laser beam LB is also influenced.

Figure 5B:
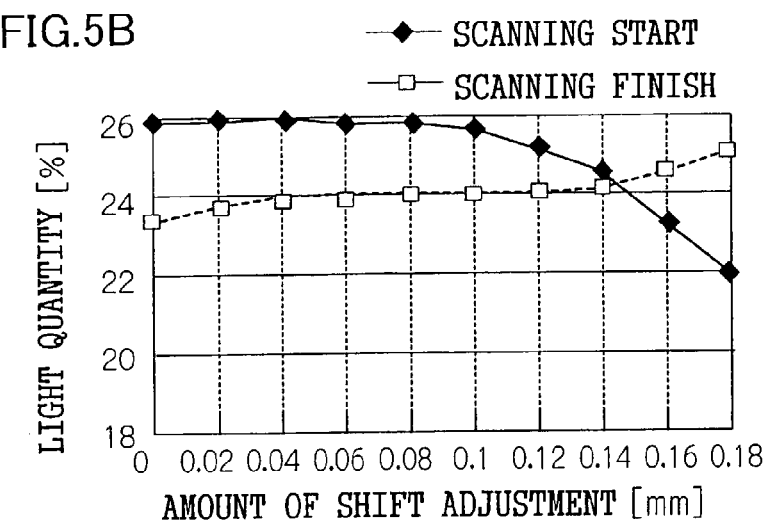
Figure 6A:
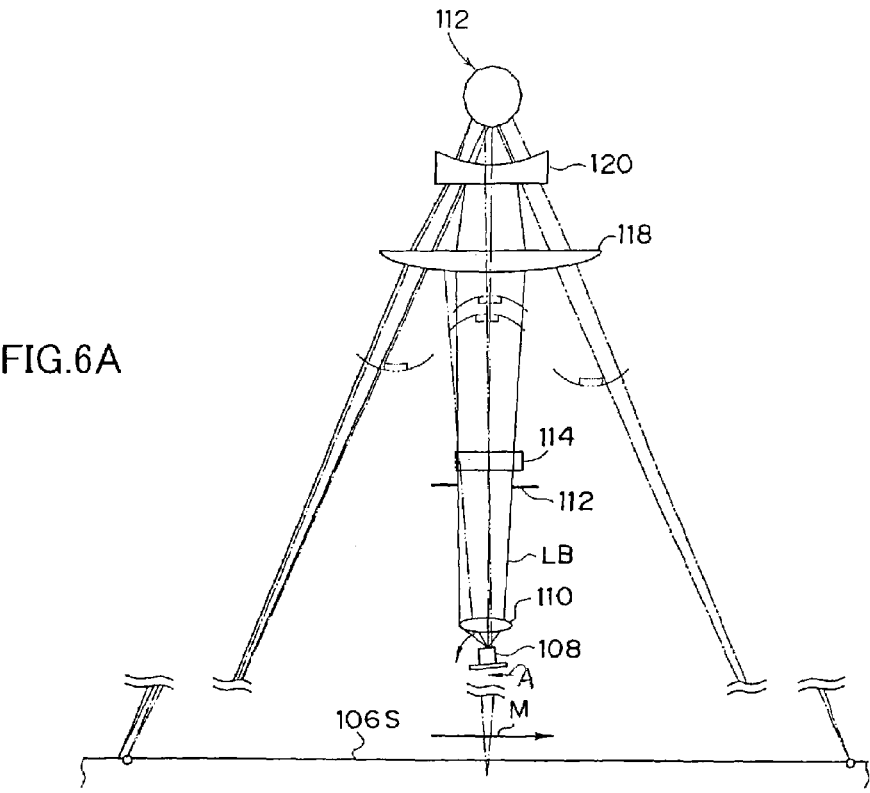
FIG. 6A is a plan view of a schematic structure of a light scanning apparatus having a laser unit of which center is shifted, shown for comparison.
Figure 6B:
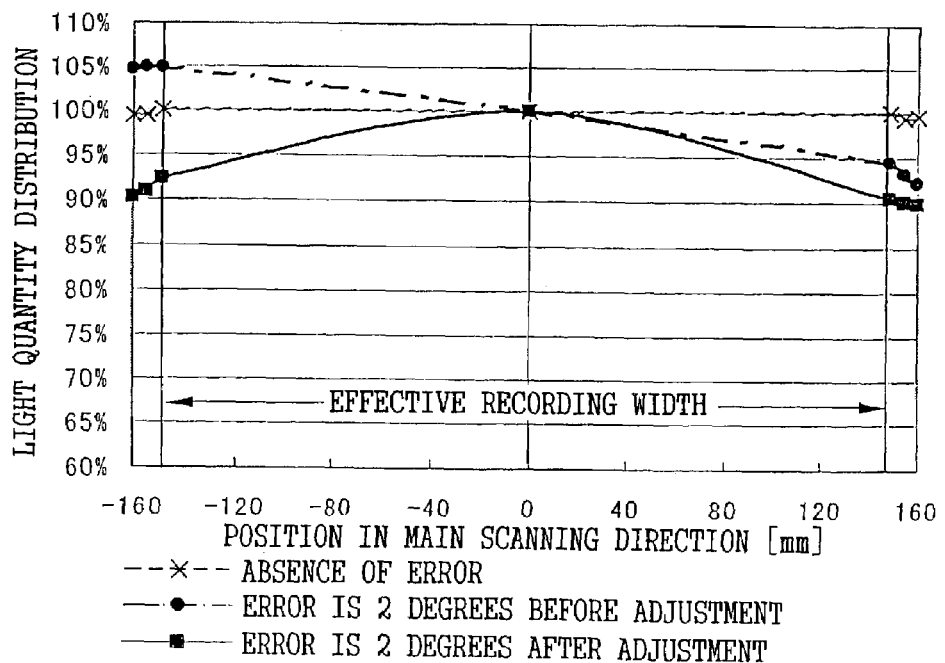
FIG. 6B is a graph showing the light quantity distribution thereof.

For comparison with the present embodiment, FIG. 5B shows the light quantities at the scanning start end and the scanning finish end relative to that at the central portion of the scanning in the state in which the center of the divergence angle of the laser is shifted by 2 degrees when the width of the aperture portion 112H in a main scanning direction is 5 mm and the light flux width on the deflecting reflection face is enlarged to 15.3 mm, in a light scanning apparatus having a structure in which an aperture for correcting light quantity distribution is formed. As shown in FIG. 5B, even if the laser unit 108 is moved, the relative light quantity is not changed at the scanning finish end, and the light quantities at both end portions is decreased as the light quantity at the scanning start end is decreased. The light quantities of both end portions substantially coincide with each other when the laser unit 108 is moved by 0.14 mm (i.e., when the laser unit 108 is moved by the amount of adjustment approximately twice as much as the amount of the adjustment in the structure having no aperture for correcting the light quantity distribution). In this case, the relative light quantity at the end potions with respect to that at the central portion is 92%, which is the same level as or rather worse than the case with the structure having no aperture for correcting the light quantity distribution. For comparison, FIG. 6A shows the schematic structure of the light scanning apparatus having the structure in which the laser unit 108 has the center shift, and FIG. 6B shows the light quantity distribution on the face being scanned, which is formed by the light scanning apparatus. In the case of the laser unit 108 having the center thereof shifted, as shown by the alternate long and short dash line in FIG. 6B, in spite that a change in the relative light quantity is small at the scanning finish side because of the effect of the aperture for correcting the light quantity distribution, the relative light quantity is significantly increased at the scanning start side due to the influence of the center shift of the light quantity, as compared with the case that the aperture for correcting the light quantity distribution is not used.

In addition, when the width of the aperture portion 112H of the aperture member 112 is large, the change in the light quantity distribution on the face being scanned is decreased even outside the required recording area.

Accordingly, as shown in FIG. 5B, the light quantity on the scanning finish side is hardly changed. If the laser unit 108 is adjustingly moved, the decrease in the light quantity at the scanning start side, caused by the shift of the center of the light quantity, is small, in which decrease the adjustment sensitivity is approximately twice as poor as the adjustment sensitivity in the case with the structure in which the aperture for correcting the light quantity distribution is not used.

Figure 5C:
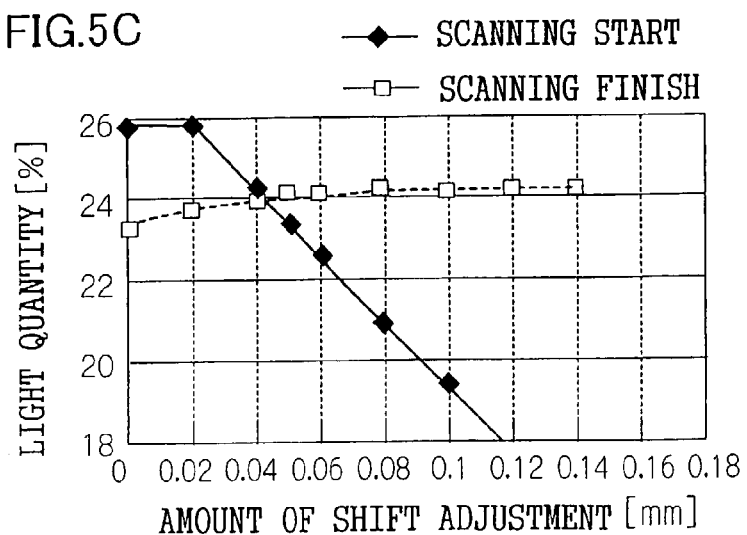

On the other hand, FIG. 5C shows the amount of the adjustment of the laser and the light quantity on the face being scanned in the light scanning apparatus 102 of the embodiment. In the present embodiment, the main scanning-direction width of the aperture portion 112H is set to 4.2 mm, and the light flux width W on the deflecting reflection face 124D is set to 12.86 mm. As shown in FIG. 5C, the amount of the movement of the laser unit 108 is set to 0.04 mm. Namely, the adjustment of the laser unit 108 can be carried out by a less amount of adjustment than the case in which the aperture for correcting the light quantity distribution is not adopted. Further, as shown in FIG. 4B, the decrease in the effect of the light quantity distribution correction is also suppressed such that the relative light quantity reaches 95% after adjustment. As shown by the broken line in FIG. 4B, as a result of restricting the light flux width in the main scanning direction by means of the aperture member 112, the light quantity distribution on the face being scanned is substantially uniform in the required recording width in the case that the center shift is absent, while the relative light quantity is rapidly decreased outside the recording width because of the light flux restriction in the main scanning. In the light quantity distribution on the face being scanned (shown by the alternate long and short dashed line) in the case that the center shift is observed, the decrease in the relative light quantity is lessened in the recording width due to the effect of the aperture for correcting the light quantity distribution at the scanning finish side. On the contrary, the relative light quantity is significantly increased at the scanning start end because the center of the light quantity is shifted.

When the laser unit 108 is moved and adjusted in order to correct the difference in the relative light quantity between the scanning start end side and the scanning finish end side, in the given amount of the adjustment, a rapid change in the relative light quantity occurs at the scanning start end portion in the recording width. Therefore, the difference in light quantity can be corrected with a relatively small amount of the movement, as compared with the structure having no aperture for correcting the light quantity distribution. This feature is apparent from the graph of FIG. 5C. As can be seen from FIG. 5C, the light quantity at the scanning start end side is changed gently up to the amount of the adjustment of 0.02 mm. However, when the amount of the adjustment exceeds 0.02 mm, the change becomes large and the difference in light quantity between the scanning start end side and the scanning finish end side is eliminated at 0.04 mm.

The error range of the above-described conditional expression, which prescribes the light flux width on the deflecting reflection face 124D, is set on the basis of the amount of the adjustment in the case that the aperture for correcting the light quantity distribution is not used. The correction sensitivity can be changed by setting the light flux width within the range in an appropriate manner. Further, it is possible to set the light flux width such that the adjustment is effected by the same amount as that of the case where the aperture for correcting the light quantity distribution is not used.

Figure 8:
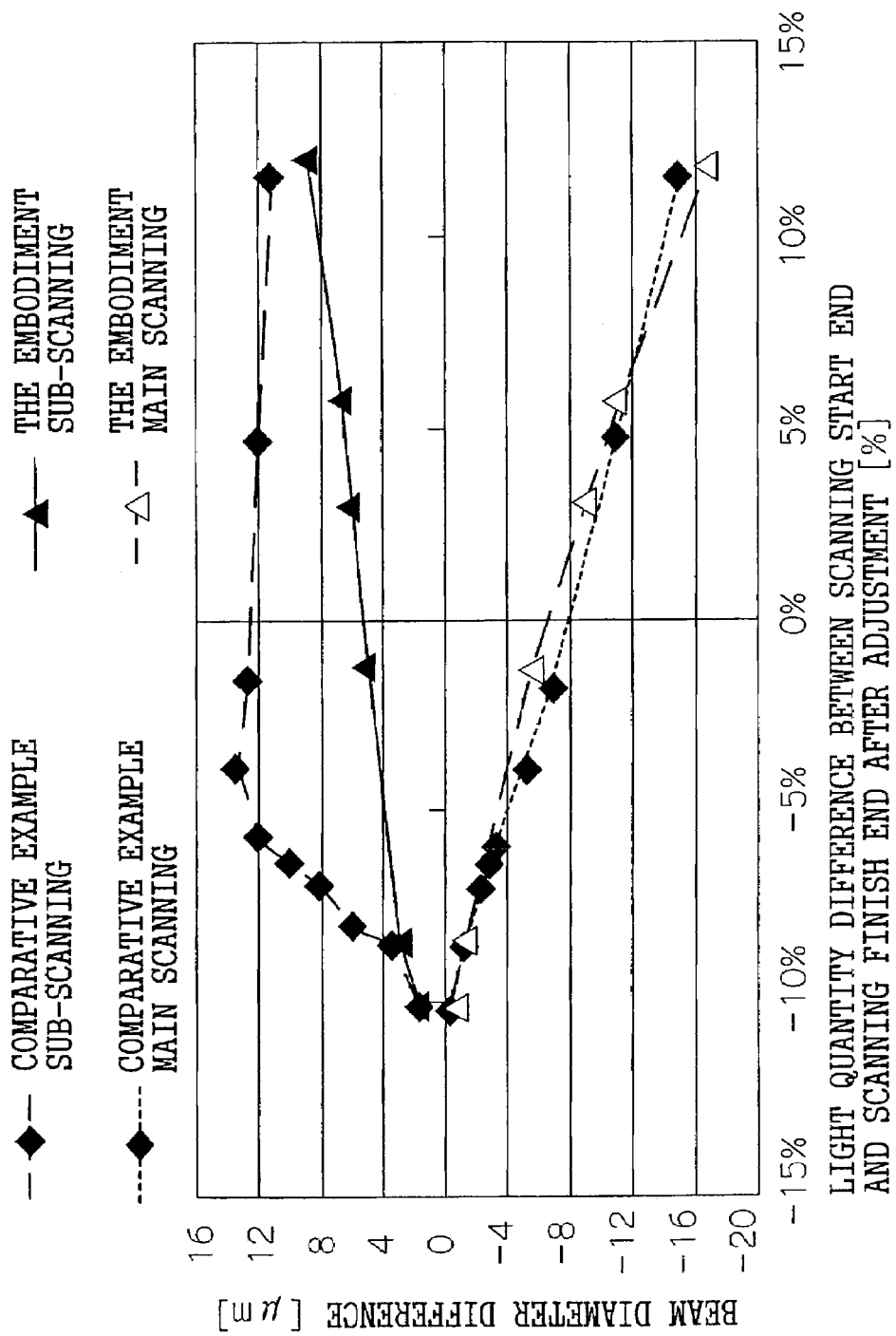
FIG. 8 is a graph showing a relationship between light quantity distribution after adjustment and uniformity of a beam diameter in the case of W=15.3 mm and in the case of W=12.86 mm (the embodiment).

The movement of the laser unit 108 has also an influence on the difference between the beam diameters (difference between the beam diameter at the central portion of the scanning and the beam diameter at the end portion of the scanning) of the laser beam LB. FIG. 8 shows the relationship between the difference in light quantity and the difference in beam diameter, after the adjustment, at the scanning start end and the scanning finish end in the main scanning direction and the sub-scanning direction, in the case of w=15.3 mm and W=12.85 mm (the present embodiment). Here, the difference in beam diameter represents a value obtained by subtracting the beam diameter at the scanning start end side from the beam diameter at the scanning end side, with the beam diameter being defined as $1/e^2$ of the peak intensity of the laser spot at the face being scanned.

As can be seen from FIG. 8, in the case of W=15.3 mm, when the light quantity distribution after the adjustment is 0%, the difference in beam diameter between the scanning start end side and the scanning finish end side is −8 μm in the main scanning direction, and the beam difference is 13 μm in the sub-scanning direction. On the contrary, in the case of W=12.86 mm of the present embodiment, the difference in beam diameter is −6 μm in the main scanning direction and the beam difference is 5.5 μm in the sub-scanning direction, which have been significantly improved, as compared with the case where W=15.3 mm. This is because the shift of a position through which a main light source of the laser passes is relatively large, as compared with the shift of the optical axis of the coupling lens 110 (i.e., aberration becomes worse because the amount of eccentricity is increased) and because a difference in truncate quantity is generated between the scanning start side and the scanning finish side in both the main scanning and sub-scanning directions, when the amount of the movement of the laser unit 108 is large.

As described above, in the present embodiment, the width in the main scanning direction of the aperture portion 112H of the aperture member 112 is set such that the light flux width in the main scanning direction on the deflecting reflection face 124D of the rotating polygon mirror 122 represents a sum of a width which enables scanning of the maximum exposure width and a width or quantity which corrects the error caused by the shift of the center of the first optical system and the laser unit 108 are added, on the deflecting reflection face 124D of the rotating polygon mirror 122. As a result, the performance of the light quantity correction can be maintained in a sufficient manner and the deterioration of the performance caused by the generation of the error can be minimized. The restriction of the laser beam LB, due to the aperture width in the main scanning direction, can be effected even in a manner of reducing to an aperture width as the above-described required light flux width. In this case, the same effect as described above can be achieved.

The structure which can move and adjust the laser unit 108 includes a structure in which a holding member for movably holding the laser unit 108 is provided and the laser unit 108 held by the holding member is moved by a tool or jig for adjustment or a motor or solenoid.

In the present embodiment, the laser unit 108 and the coupling lens 110 are structured such that the position of the laser unit 108 is adjustable relative to the position of the coupling lens 110. However, a structure in which the laser unit 108 and the coupling lens 110 are integrally moved for adjustment is also acceptable, because the incident position of the laser is adjustable on the deflecting reflection face 124D and thus the uniformity of the light quantity can be corrected in such a structure. In particular, in the case that the synthetic focal distance of the first optical system 126 is short, the shift of the main light beam caused by the center shift of the divergence angle is decreased on the deflecting reflection face 124D. Therefore, by moving the laser unit 108 and the coupling lens 110 in an integral manner, the eccentricity of the coupling lens 110 and main light beam of the laser are suppressed to alleviate deterioration of the aberration, whereby deterioration in uniformity of beam diameter can be prevented.

For example, in the case that the synthetic focal distance of the first optical system 126 is 12.5 mm, when the center shift of the divergence angle is γ (here, 2 degrees), the amount of the movement of the main light beam is 12.5·sin (γ) mm on the deflecting reflection face 124D, and (when γ is set to 2 degrees) the amount of the movement is actually 0.44 mm. Accordingly, the difference in light quantity can be corrected by moving integrally the laser unit 108 and the coupling lens 110 by 0.22 mm. In this case, as the position of the main light beam which passes through the coupling lens 110 is not changed, the change in the aberration as a result of the adjustment, is not generated. Only the differences in beam diameter between the scanning start side and the scanning finish side, which is caused by the truncate quantity difference, is generated in both the main scanning and sub-scanning directions. Accordingly, the degradation of the image quality does not occur.

Figure 9:
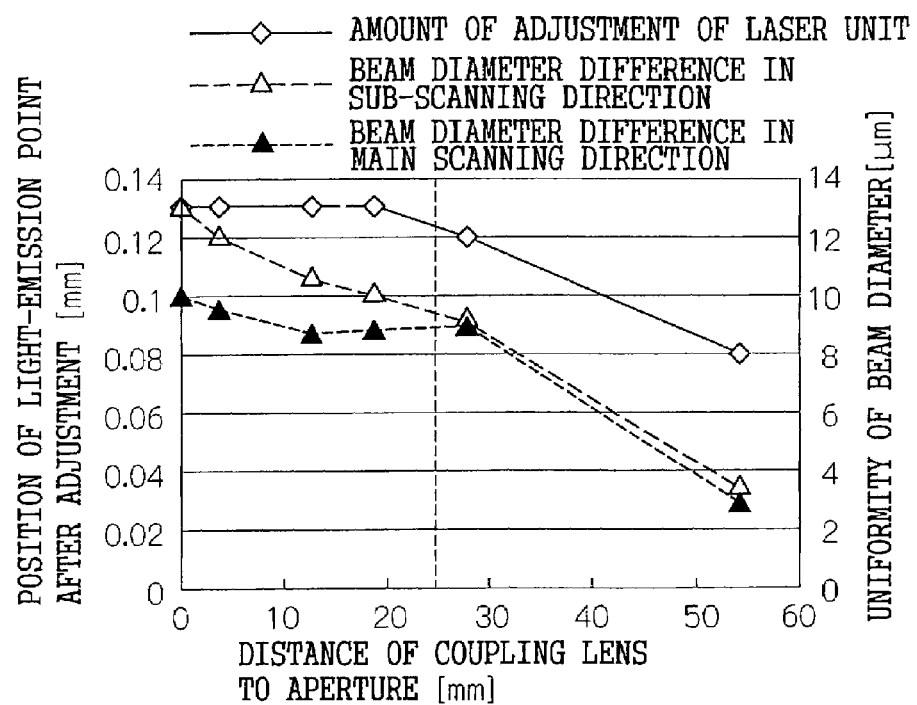
FIG. 9 is a graph showing a relationship, when the center of the divergence angle of the laser beam is shifted by 2 degrees, between: the amount of adjustment of a laser unit in a case where light quantity of the scanning start side is made equal to the light quantity of a scanning finish side; beam diameter difference between the scanning start end and the scanning finish end; and a change in distance between a coupling lens and an aperture member.

The arrangement of the aperture member 112 will be described below. FIG. 9 is a graph showing the relationship among: the amount of the adjustment of the laser unit 108; the difference in beam diameter between the scanning start end and the scanning finish end; the change in the distance between the coupling lens 110 and the aperture member 112, when the center shift of the divergence angle of the laser beam LB is 2 degree and the adjustment is performed so that the light quantities at the scanning start end and the scanning finish end are made equal. In this case, the arrangement position of the aperture member 112 and the aperture width thereof are set such that the main scanning width is 15 mm on the deflecting reflection face 124D, in consideration of the main scanning direction width of the aperture portion 112H of the aperture member 112.

As shown in FIG. 9, for example, if the light flux width in the main scanning direction on the deflecting reflection face 124 is 15 mm, which is larger than that in the second embodiment, the amount of the adjustment of the laser unit 108 can be reduced and thus the difference in beam diameter can also be reduced by arranging the aperture member 112 such that the aperture member 112 is distanced from the exit pupil position of the coupling lens 110 by more than 12.5 mm, which is the focal distance of the laser unit 108 (preferably by a distance approximately at least twice as large as this focal distance) toward a rotating polygon mirror 112 side. The position of a light-emission point of the laser unit 108 is changed, as the laser unit 108 is adjustingly moved. However, between the coupling lens 110 and a position which is distanced from the exit pupil of the coupling lens 110 by a distance of the focal distance of the coupling lens 110, the amount of the correction of the light quantity difference is small, because the amount of the change in the main light beam is smaller than the amount of the movement of the laser unit 108. On the contrary, when the aperture member 112 is distanced from the exit pupil of the coupling lens 110 by a distance no shorter than the focal distance of the coupling lens 110, the amount of the correction of the light quantity difference becomes large, because the amount of the change in the main light beam is larger than the amount of the movement of the laser unit 108. AS a result, the deterioration of the aberration can be suppressed, because the adjustment sensitivity is increased and the difference in light quantity can be correct with a relatively small amount of the movement. As the aforementioned effect is combined with the effect in which the laser beam LB is restricted in the main scanning direction by the aperture portion 112H, the adjustment sensitivity can further be improved and the effect of improving the aberration in adjustment can further be improved.

A third embodiment of the present invention will be described below. FIG. 10A shows a development of a light scanning apparatus 302 of the third embodiment, as seen from a direction perpendicular to the main scanning face. The light scanning apparatus 302 of the third embodiment has a structure, in which two laser units 108 are provided, and one laser beam LB is irradiated from each laser unit 108, respectively, whereby two laser beams LB in total are irradiated. In accordance with this structure, two coupling lenses 110, two aperture members 112, two cylindrical lenses 114, two reflecting mirrors 116, and cylindrical lens 118 and 120 are arranged. Since each of these members has the same structure as that in the first embodiment, detailed description thereof is omitted. However, when two similar members are particularly to be described in a distinguished manner from each other in the following description, the two members will be distinguished from each other by designating A or B to the reference numerals thereof.

The detailed description of an image forming apparatus of the third embodiment will be omitted, because the image forming apparatus can be formed by simply replacing the structure of the light scanning apparatus of the first or second embodiment with that of the third embodiment.

In the light scanning apparatus 302 of the third embodiment, each of the laser beams LB irradiated from the laser units 108 passes through the aperture portion 112H (refer to FIG. 1) of the aperture member 112, and is incident to the rotating polygon mirror 122 through the cylindrical lens 114, the reflecting mirror 116, and cylindrical lenses 118 and 120. Each laser beam LB is incident to the cylindrical lenses 118 and 120 at inclination angles of βA and βB in the main scanning plane, respectively, with respect to the optical axis of the cylindrical lenses 118 and 120. After the laser beam LB, which is incident in the inclined manner, is deflection-scanned by the rotating polygon mirror 122, the laser beam LB is passed through the cylindrical lenses 118 and 120, is provided with fθ characteristic, and focused in the main scanning plane (i.e., image formation action). The laser beam LB that has passed through the cylindrical lenses 118 and 120 is folded by the cylindrical mirror 130, and focused on the face being scanned on the photoconductive drum 106. In the present embodiment, a position in the sub-scanning direction of the laser beam LB is determined so that each laser beam LB forms a different scanning line on the face being scanned. With regards to the specific structure thereof, for example, different scanning lines can be obtained by making the angles in the direction perpendicular to the scanning plane of the laser beam LB different, so that subtle differences in angle are generated between the laser beams LB. Consequently, scanning density can be doubled, while the same scanning speed is maintained, which contributes to the speedup of the image forming and high resolution in the image forming apparatus.

By scanning the laser beam LB at the different scanning positions on the same photoconductive drum 106 or scanning the laser beam LB on the different photoconductive drums 106, the images of different colors can be formed. Further, these images of different colors can be superimposed to form a multicolor image. That is, the image forming apparatus of the present invention can be employed as a multicolor image-forming apparatus. Regarding the specific structure, the difference in angle in the direction perpendicular to the main scanning plane of the laser beam LB may be made larger, so that each laser beam may be spatially separated after passing through the cylindrical lenses 118 and 120. The structure may be formed such that the two cylindrical mirrors 130 (refer to FIG. 1) are provided corresponding to each laser beam LB, and each laser beam LB is incident to each cylindrical mirror 130 so as to form image in the sub-scanning direction and scan at different scanning positions.

In the present embodiment, the incident angles βA and βB with respect to the optical axis are set to −8 degrees and 8 degrees, respectively, assuming that the clockwise direction in FIG. 10A is the positive direction. In the case that a structure is employed in which the laser beams LB are incident to the rotating polygon mirror 122 at different incident angles in the main scanning plane, if the intensity center of the laser beam LB and the optical axis of the cylindrical lenses 118 and 120 are made to intersect the deflecting reflection face 124D at the same position, a peak of the light quantity distribution is shifted on the face being scanned, and consequently, a difference in light quantity between the scanning start side and the scanning finish side is generated, although the center shift of the divergence angle of the laser beam LB is absent. Such inconvenience can be avoided by shifting in advance the intensity center of the laser beam LB within the deflecting reflection face 124D from the optical axis of the cylindrical lens 114. In the present embodiment, since the diameter of an inscribed circle of the rotating polygon mirror 122 is 25 mm, the center of the laser light quantity of the laser beam LBA is shifted by 0.4 mm toward the left side of FIG. 10A with respect to the optical axis of the cylindrical lens 114, while the center of the laser light quantity of the laser beam LBB is shifted by 0.4 mm toward the right side of FIG. 10A with respect to the optical axis of the cylindrical lens 114, whereby the uniformity of the light quantity distribution is secured in the case where there is no error.

Figure 11:
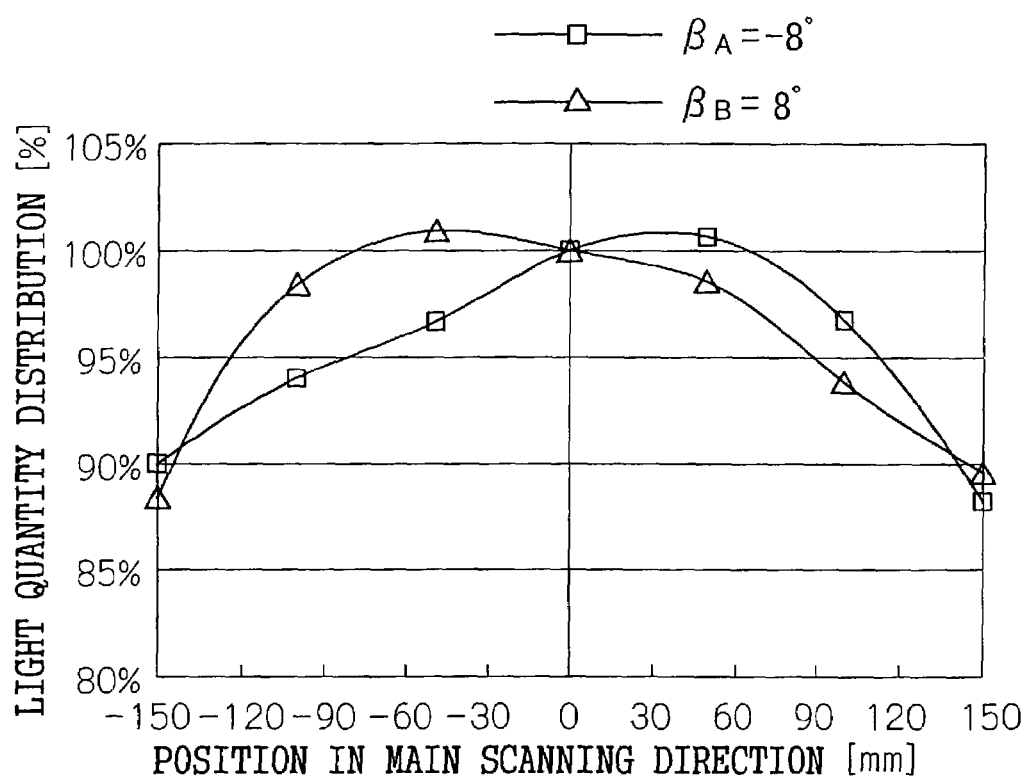
FIG. 11 is a graph showing the light quantity distribution in the light scanning apparatus of the third embodiment, in a state in which light quantity difference, in a case that the center of the divergence angle of the laser beam is shifted by 2 degrees, has been adjusted by shift adjustment of a laser unit 8 such that the light quantity differences at both ends are equal.

However, when the difference in light quantity between the scanning start side and the scanning finish side, which is caused by the center shift of the divergence angle of the laser beam LB, is corrected by the shift adjustment of the laser unit 108 or the coupling lens 110, the asymmetry of the shape of the light quantity distribution after the adjustment may be generated. Such asymmetry of the shape of the light quantity distribution may result in a change in the density. FIG. 11 shows the light quantity distribution, in the case that the incident angles βA and βB are set to −8 degrees and 8 degrees, respectively, the aperture portion 112H of the aperture member 112 is formed in the symmetrical shape with respect to the optical axis, and the difference in light quantity when the center shift of the divergence angle of the laser beam LB is 2 degrees is adjusted by the shift adjustment of the laser unit 108 so that the light quantities at both ends are made uniform. In each case, the light quantities at both ends (i.e., light quantity at the neighborhood of ±150 mm, strictly at the position of 148.5 mm, which is the scanning finish end) are about 90%, respectively, and substantially coincide with each other. In the case of βB=8, the position of the maximum intensity in the light quantity distribution is located at the position of −50 mm, and the light quantity is rapidly changed in the range of −100 mm to −148.5 mm. On the contrary, in the case of βA =−8 degrees, the maximum value in the light quantity distribution is located at the position of +30 mm, and the light quantity is remarkably decreased from the position of the maximum value toward the position of +148.5 mm, which is the scanning finish end. Since a decrease in the light quantity generates a change in the density in the image that is formed actually, the decrease in the light quantity is not preferable. Further, in the case that the different scanning lines are scanned by the plurality of laser beams LB, as difference in light quantity is generated for every scanning line except the scanning ends and the central portion of the scanning, the pitch-shaped density fluctuation is formed to generate a defect of the image quality such as streaks of a stripe pattern in the main scanning direction.

In the case that the multicolor image is obtained by scanning the different positions with the plurality of laser beams LB as described above, the change in the density is generated for every color to create so-called secondary color, tertiary color, and the like. As a result, a tint sometimes becomes different when the plurality of colors are superimposed. Such a change in tint is more easily recognizable by human eyes than a change in the density of a monochrome. Accordingly, if the density difference between the monochromes is not more than 5%, color shading is generated in the same print surface and the degradation of the image quality occurs. In this case, it is necessary to reduce the difference in light quantity.

Thus, in the present embodiment, the width in the main scanning direction of the aperture portion 112H of the aperture member 112 is formed so as to bee asymmetric with respect to the optical axis of the first optical system 126, so that the light quantity in the main scanning direction of the light flux on the deflecting reflection face 124D is asymmetrical to the center of the light quantity. More specifically, the shape in the main scanning direction of the aperture member 112 is set such that the light flux width thereof, in the main scanning direction, on the side incident to the rotating polygon mirror 122 is enlarged, as compared with the light flux width thereof on the opposite side. FIG. 10C shows the light quantity distribution represented by a curve DLA and a curve DLB in a light scanning apparatus of the structure having the asymmetric aperture portion as described above. FIG. 10B shows the light quantity distribution represented by a curve DLA' and a curve DLB' in a light scanning apparatus of the structure having the symmetric aperture portion.

Figure 12:
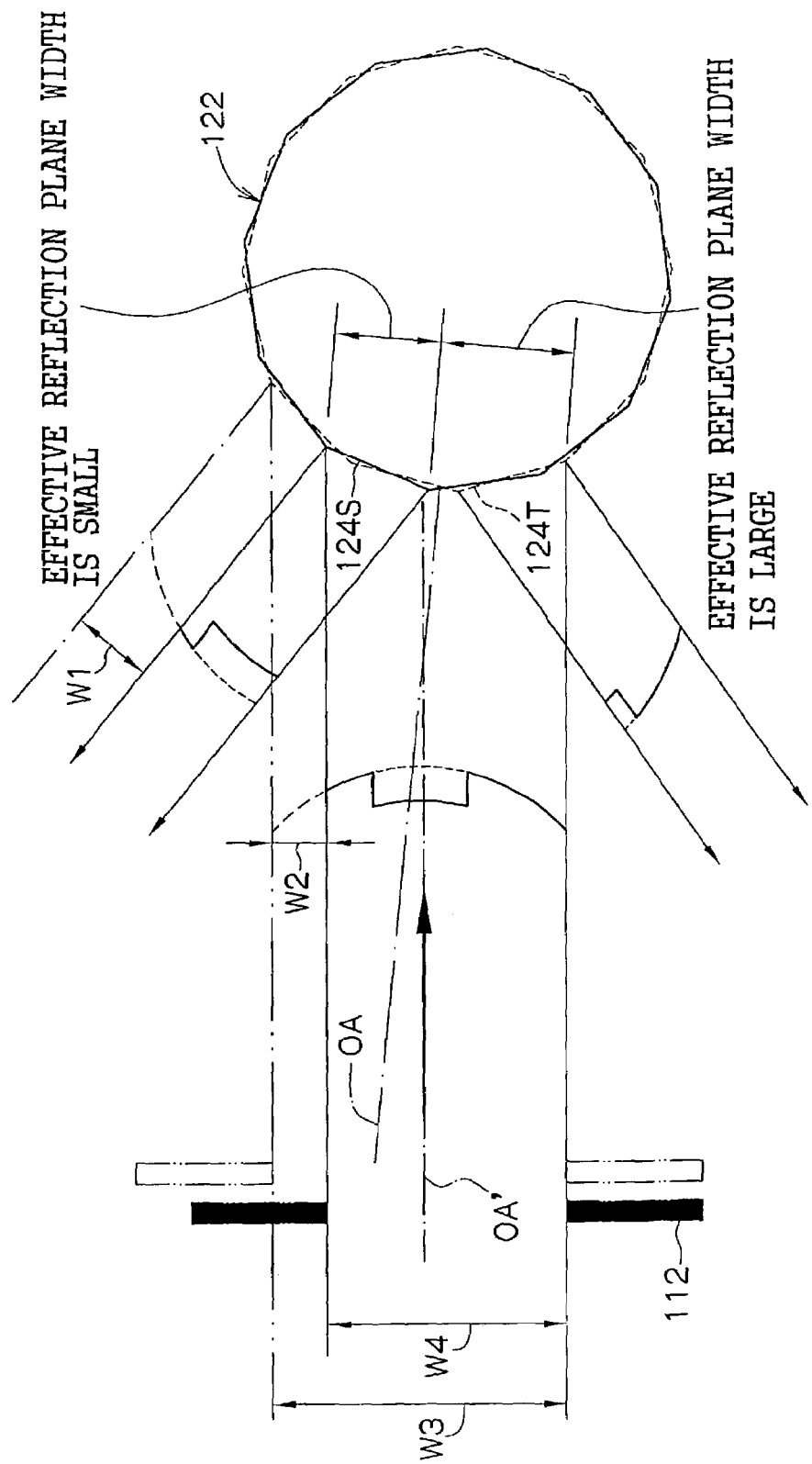
FIG. 12 is an explanatory view in which the vicinities of a rotating polygon mirror, of the light scanning apparatus according to the third embodiment of the invention, are enlarged.
Figure 13:
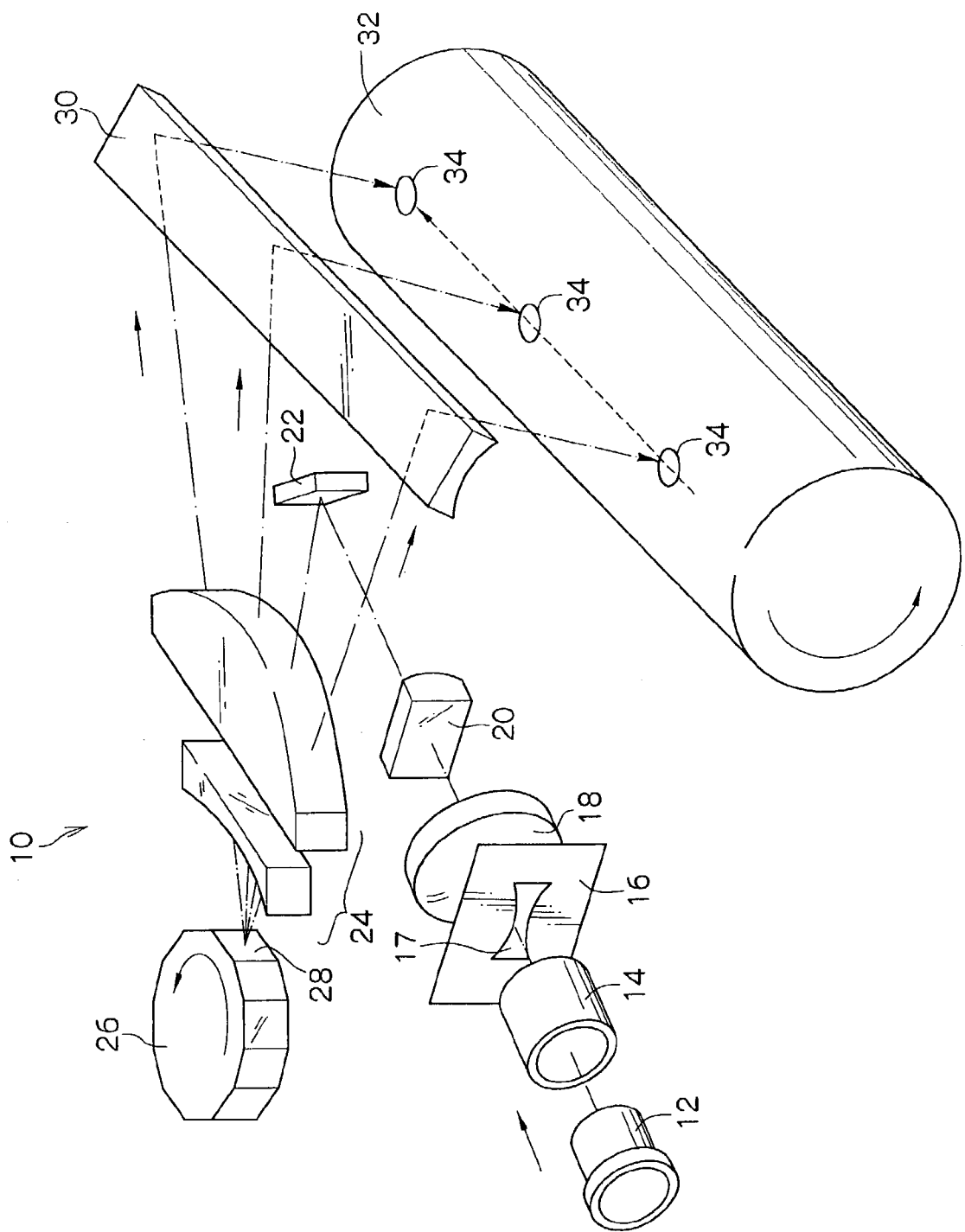
FIG. 13 is a perspective view showing a schematic structure of a conventional image forming apparatus.
Figure 14:
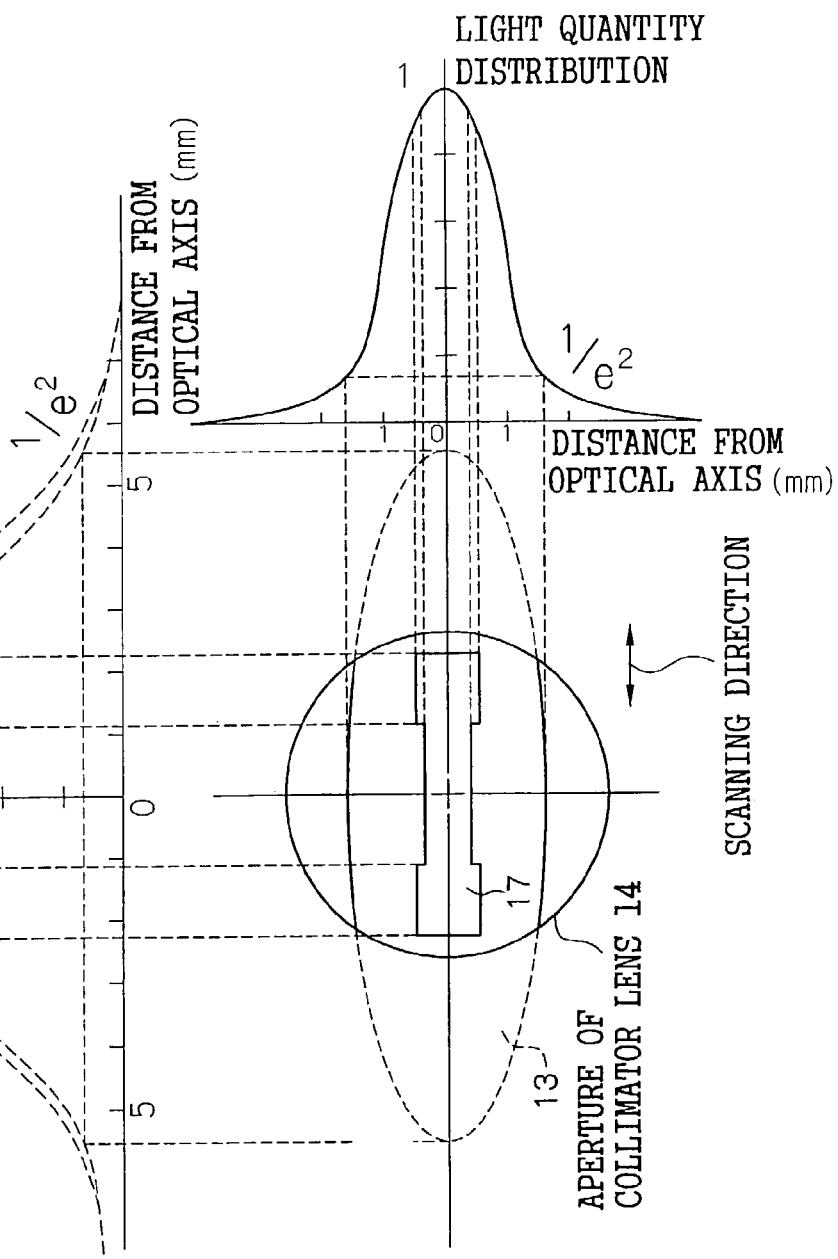
FIG. 14 is a graph showing the light quantity distribution of the image forming apparatus shown in FIG. 13.
Figure 15:
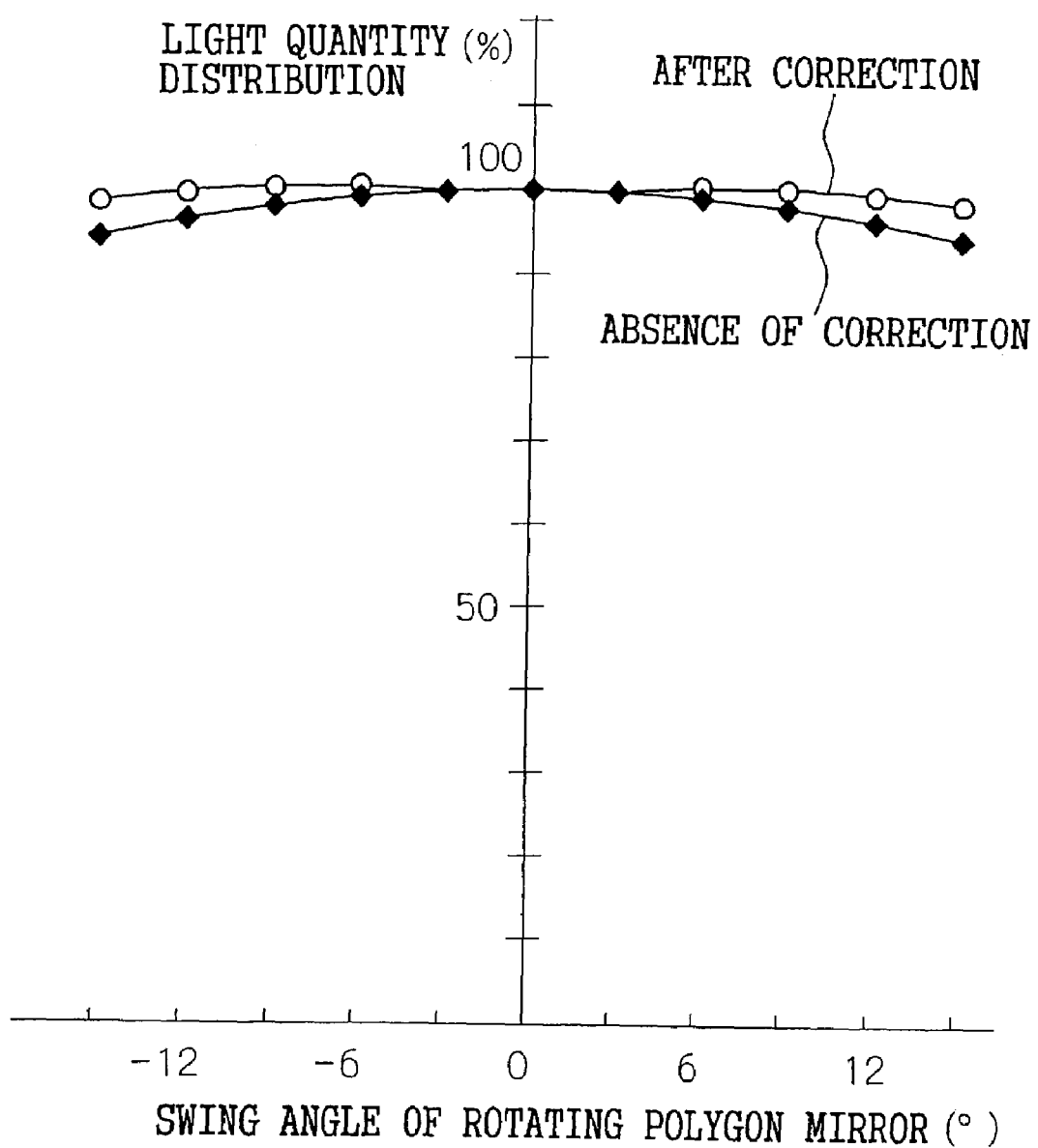
FIG. 15 is a graph showing an effect of correction of the light quantity distribution in the image forming apparatus shown in FIG. 13.
Figure 16:
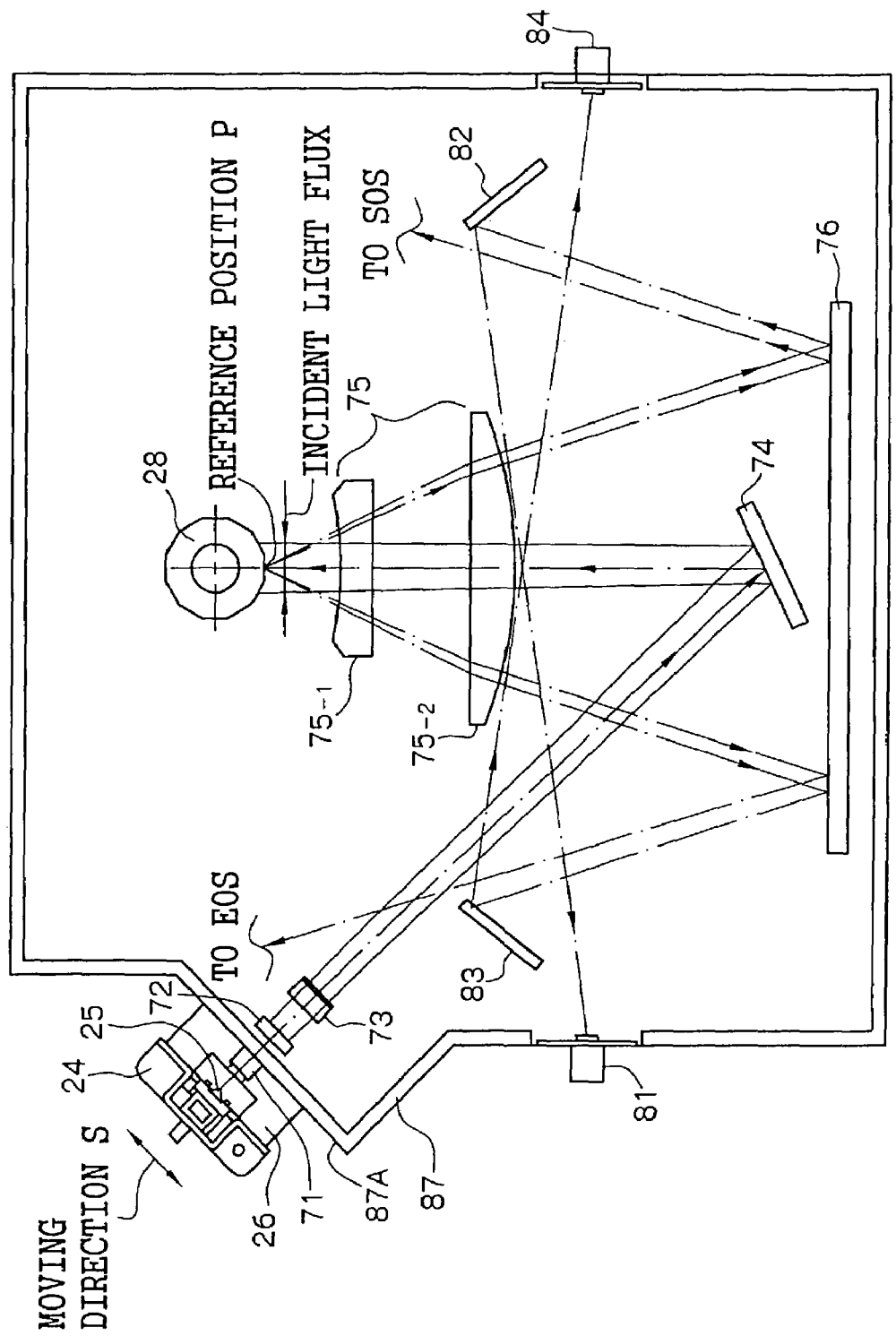
FIG. 16 is a plan view showing a schematic structure of a conventional image forming apparatus different from that of FIG. 13.
Figure 17:
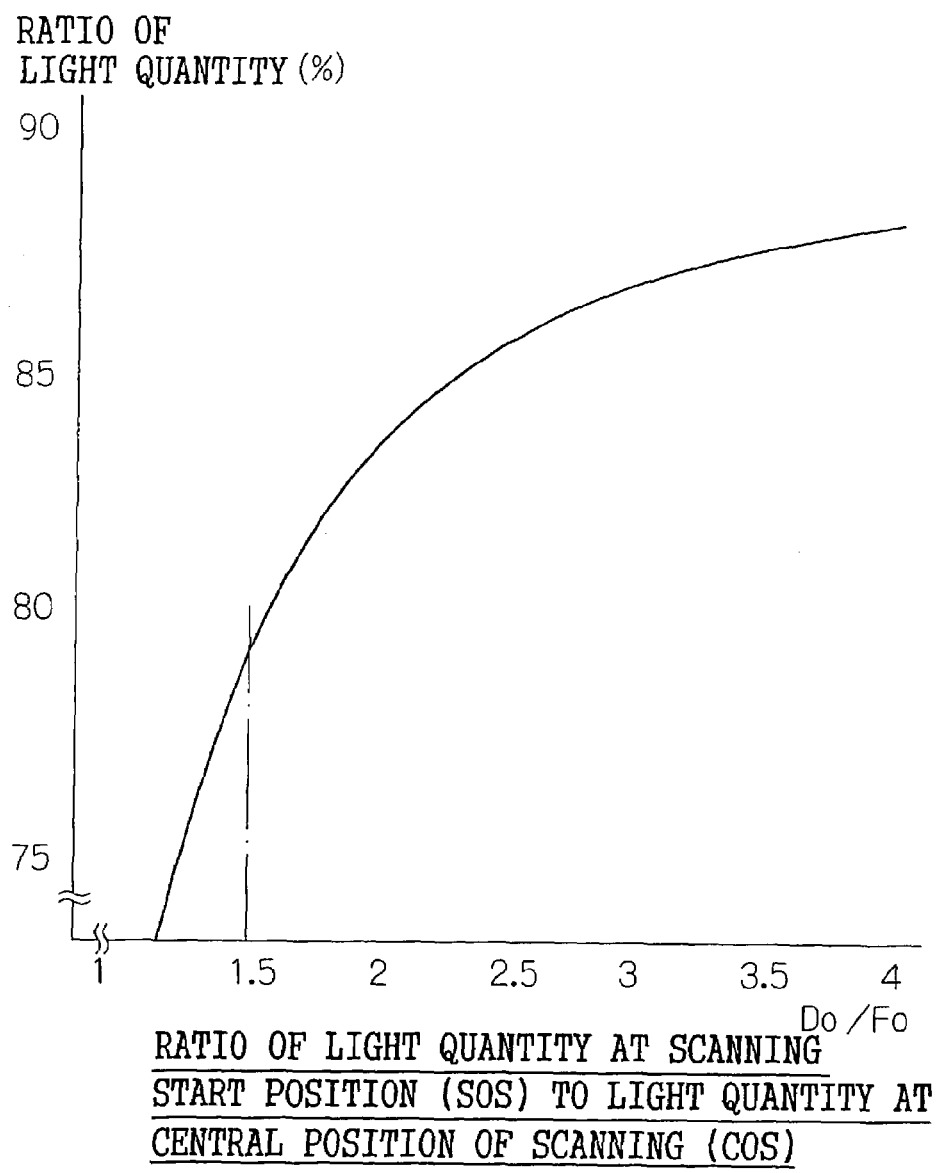
FIG. 17 is a graph showing a relationship between $D_o/F_Q$ and a ratio of the light quantity at a scanning start position to the light quantity at a scanning finish position in a conventional image forming apparatus different from FIG. 13 and FIG. 16.

The above-described point will be described in detail by using FIG. 12. FIG. 12 is a schematic view of the vicinities of the deflecting reflection face of the laser beam LBA incident to the optical axis of the scanning optical system 128 (refer to FIG. 10) from the downside. The laser beam (light flux) in the case of the structure having the asymmetric aperture portion is shown by the solid line, and the laser beam (light flux) in the case of the structure having the symmetric aperture portion is shown by an alternate long and two short dashes line. Hereinafter, the term of "up" or "down" should be used in up or down of FIG. 12, except where specifically noted. In FIG. 12, for convenience of the description, because the incident light flux of the laser beam LBA is set to be horizontal, the optical axis OA of the scanning optical system 128 is inclined.

As shown in FIG. 12, when the laser beam LBA is incident in an inclined manner in the main scanning plane, the angle of the deflecting reflection face 124D with respect to the optical axis of the scanning optical system 128 at the time of scanning start is not symmetrical to that at the time of scanning finish. Thus, dimensions of the effective reflection face are made different. Accordingly, as shown by the alternate long and two short dashes line in FIG. 12, when the laser beam LBA whose light flux width is symmetrical with respect to the optical axis OA' is incident to the deflecting reflection face 124D, the light flux width on the side where the effective reflection face is relatively small (refer to the portion represented as a width W1) becomes an excess. The excess becomes larger, when the intensity center of the laser beam LB at the deflection point is shifted from the optical axis OA of the scanning optical system 128 in order to correct the center shift of the light quantity distribution in the aforementioned inclined incidence. The excess light flux width also decreases the adjustment sensitivity when the difference in light quantity caused by the center shift of the laser beam LB is corrected (refer to the portion represented as a width W2), which causes the shift of the intensity peak of the light quantity distribution.

When the center of the divergence angle of the laser beam LBA is shifted upward on the deflection plane, since the intensity center of the light flux on the deflection plane is also shifted upward, the light quantity distribution on the face being scanned becomes relatively large at the upper-side portion thereof (the scanning start side in the present embodiment). When the laser beam LBA is adjusted in order to correct the ununiformity of the light quantity distribution described above, the laser unit 104 is generally moved so that the center of the light quantity on the deflection plane is eventually returned downward. However, in the structure having the symmetric aperture portion (refer to the portion represented as a width W3) such as the aperture member 112' shown by the alternate long and short dashes line in FIG. 12, the change in the light quantity of the scanning light flux is decreased in the upper-side portion thereof, i.e., at the scanning start end side, and therefore it is difficult to obtain the effect of the adjustment. Further, since the effective reflection face is relatively small, the portion of the light flux width which is rendered unnecessary becomes large, relative to the required light flux width (in FIG. 12, comparing two reflection faces 124S and 124T, the width of the effective reflection face in the reflection face 124S at the upper-side (in Figure) is smaller than the width of the effective reflection face of the reflection face 124T at the lower-side). Consequently, the reflection face 124S whose effective reflection face is smaller requires the larger amount of the adjustment, which results in the overcorrection, the center of the light quantity is shifted more downward, and the maximum position of the light quantity distribution on the face being scanned is also moved toward the scanning finish end side (downside in FIG. 12). As described above, when an amount of the adjustment is large, the difference in light quantity is eliminated in a portion where the decrease in the relative light quantity is large. As a result, the effect of correcting the light quantity distribution is decreased, and the light quantity on one side tends to be changed rapidly. On the other hand, in the case of the laser beam LBB in which the incident angle is reverse in the main scanning plane, the overcorrection is performed so that the maximum position of the light quantity distribution is moved toward the scanning start end side.

In the embodiment, as shown by the solid line in FIG. 12, the main scanning direction width of the aperture portion 112H of the aperture member 112 is formed to be symmetrical, such that only the light flux width on the side where the effective reflection face width is relatively small (the upper-side portion in FIG. 12) is reduced (refer to the portion represented as a width W4). Consequently, if the center of the divergence angle of the laser beam LB is shifted toward any side, as the amount of the movement of the laser beam LB caused by the shift adjustment is set at a minimum and the overcorrection can be prevented, the difference in light quantity of both ends are made to coincide with each other without decreasing the relative light quantities at both ends. Furthermore, the shift of the maximum position of the light quantity distribution can be decreased, and the change in the density and the change in the tint can be minimized.

In the laser beams LBA and LBB, although the corresponding shapes of the aperture portion 112H of the aperture member 112 are reversed therebetween (i.e., symmetrical), when absolute values of the incident angles are equal as described above (8 degrees in the present embodiment), the widths of the portions which are asymmetric between LBA and LBB may be equal to each other. Therefore, by using the same aperture member 112 with the aperture member 112 being reversed, the same member can be used in common, whereby the cost for manufacturing members can be reduced. Further, assembly operation for installing the aperture member 112 becomes easy.

In short, as the present invention has the above-described structure, the degradation of the image quality caused by the flare light can be reliably prevented in the light scanning apparatus adopting the overfilled optical system.

What is claimed is:

1. A light scanning apparatus comprising:
a light source that irradiates a light beam;
a first optical system that shapes the light beam irradiated from the light source;
a rotating polygonmirror that has a plurality of reflection faces that reflect, while the rotating polygon mirror is rotated, the light beam shaped by the first optical system, thereby deflection-scanning the light beam;
a scanning optical system that focuses the light beam deflection-scanned by the rotating polygon mirror on a face being scanned to form an image; and
an aperture that includes an H-shaped aperture portion having end portions formed to be enlarged in a sub-scanning direction compared with a central portion of the aperture portion, the aperture reduces a width in a main scanning direction of the light beam incident to the reflection face, the width of the light beam in the main scanning direction along a direction of the deflection-scanning having been widened larger than the width of the reflection face by the shaping of the first optical system,
wherein the aperture reduces the width of the light beam in the main scanning direction in a region outside an effective scanning region.

2. The light scanning apparatus according to claim 1, wherein the aperture is arranged between the light source and the rotating polygon mirror, and includes the aperture portion that transmits the light beam.

3. The light scanning apparatus according to claim 2, wherein
the light beam is incident to the reflection face of the rotating polygon mirror, in a scanning plane, at a predetermined angle of inclination with respect to an optical axis of the scanning optical system,
the width in the main scanning direction of the aperture portion of the aperture is asymmetrical to the optical axis of the first optical system, and the width from an optical axis of the first optical system to an aperture portion end face of a rotating polygon mirror incidence side is wider than a contrariness side.

4. The light scanning apparatus according to claim 1, wherein the first optical system includes a coupling optical system that condenses the light beam irradiated from the light source, and a first holding member that holds the light source and the coupling optical system such a the position of the light source relative to the coupling optical system is adjustable.

5. The light scanning apparatus according to claim 4, wherein the aperture is located at a position away from an exit pupil of the coupling optical system toward a side of the rotating polygon mirror at least by a focal distance of the coupling optical system.

6. The light scanning apparatus according to claim 1, wherein the first optical system includes a coupling optical system that condenses the light beam irradiated from the light source and a second holding member that holds the light source and the coupling optical system in an integrated manner such that the light source and the coupling optical system can be moved integrally.

7. The light scanning apparatus according to claim 6, wherein the aperture is located at a position away from an exit pupil of the coupling optical system toward a side of the rotating polygon mirror at least by a focal distance of the coupling optical system.

8. A light scanning apparatus comprising:
a light source for irradiating a light beam;
a first optical system that shapes the light beam irradiated from the light source;
a rotating polygon mirror, which has a plurality of reflection faces that reflect, while the rotating polygon mirror is rotated, the light beam shaped by the first optical system, thereby deflection-scanning the light beam;
a scanning optical system that focus the light beam deflection-scanned by the rotating polygon mirror on a face being scanned to form an image; and
an aperture that reduces a width of the light beam in a main scanning direction of the light beam incident to the reflection face, the width of the light beam in the main scanning direction along a direction of the deflection-scanning having been widened larger than the width of the reflection face, by shaping with the first optical system,
wherein, in the aperture, a light flux width W in the reflection face, in the direction orthogonal to an optical axis of the scanning optical system in a reflection face, satisfies the following expression;

$$\phi \times \sin(\theta/2 + \pi/n) \leq W \leq \phi \times \sin(2\pi/n) + 0.035 \times f$$

where $\phi$ is a diameter of a circumscribed circle of the rotating polygon mirror, n is the number of faces of the rotating polygon mirror, $\theta$ is a maximum scanning half angle in scanning an effective scanning width in the face being scanned, and f is a focal distance in the main scanning direction in the entire optical system from the light source to the first optical system, and the width in a sub-scanning direction orthogonal to the direction of the deflection-scanning is adapted to correct a light quantity distribution in the scanning direction on the face being scanned.

9. The light scanning apparatus according to claim 8, wherein the aperture is arranged between the light source and the rotating polygon mirror, and includes an aperture portion that transmits the light beam.

10. The light scanning apparatus according to claim 9, wherein
the light beam is configured to be incident to the reflection face of the rotating polygon mirror, in a scanning plane, at a predetermined angle of inclination with respect to an optical axis of the scanning optical system,
the width in the main scanning direction of the aperture portion of the aperture is asymmetrical to the optical axis of the first optical system, and
the width from an optical axis of the first optical system to an aperture portion end face of a rotating polygon mirror incidence side is wider than a contrariness side.

11. The light scanning apparatus according to claim 8, wherein the first optical system includes a coupling optical system that condenses the light beam irradiated from the light source, and a first holdingmember that holds the light source and the coupling optical system such that a position of the light source relative to the coupling optical system is adjustable.

12. The light scanning apparatus according to claim 11, wherein an aperture member is located at a position away from an exit pupil of the coupling optical system toward a side of the rotating polygon mirror, at least by a focal distance of the coupling optical system.

13. The light scanning apparatus according to claim 8, wherein the first optical system includes a coupling optical system that condenses the light beam irradiated from the light source, and a second holdingmember, that holds the light source and the coupling optical system in an integrated manner such that the light source and the coupling optical system can be moved integrally.

14. The light scanning apparatus according to claim 13, wherein the aperture member is located at a position away from an exit pupil of the coupling optical system toward a side of the rotating polygon mirror, at least by a focal distance of the coupling optical system.

15. A light scanning apparatus comprising:
a light source that irradiates a light beam;
a first optical system that shapes the light beam irradiated from the light source;
a rotating polygon mirror that has a plurality of reflection faces that reflect, while the rotating polygon mirror is rotated, the light beam shaped by the first optical system, thereby deflection-scanning the light beam;
a scanning optical system that focuses the light beam deflection-scanned by the rotating polygon mirror on a face being scanned to form an image; and
an aperture that includes an H-shaped aperture portion and that reduces a width of the light beam in a main scanning direction of the light beam,
wherein the first optical system increases the width of the light beam in the main scanning direction wider than a width of the reflection face, the main scanning direction being along the direction of reflection scanning, while the aperture reduces the width of the light beam in the main scanning direction, in a region outside an effective scanning region, and corrects a light quantity distribution, on the face being scanned, of the light beam such that the light quantity distribution is made uniform by changing a width in a sub-scanning direction of the aperture.

16. The light scanning apparatus according to claim 15, wherein the aperture is formed such that the width of the light beam in the main scanning direction of the light beam is minimized with respect to a required light flux width on the reflection face of the rotating polygon mirror.

17. The light scanning apparatus according to claim 15, wherein, in the aperture, a light flux width W in the direction orthogonal to an optical axis of the scanning optical system on the reflection face, in a deflection plane, satisfies the following expression;

$$\phi \times \sin(\theta/2 + \pi/n) \leq W \leq \phi \times \sin(2\pi/n) + 0.035 \times f$$

where $\phi$ is a diameter of a circumscribed circle of the rotating polygon mirror, n is the number of faces of the rotating polygon mirror, $\theta$ is a maximum scanning half angle in scanning an effective scanning width in the face being scanned, and f is a focal distance in the main scanning direction in the entire optical system from the light source to the first optical system.

18. The light scanning apparatus according to claim 15, wherein the first optical system includes a coupling optical system, that condenses the light beam irradiated from the light source, and a first holding member, that holds the light source and the coupling optical system such that the position of the light source relative to the coupling optical system is adjustable.

19. The light scanning apparatus according to claim 18, wherein the aperture member is located at a position away from an exit pupil of the coupling optical system toward a rotating polygon mirror side, at least by a focal distance of the coupling optical system.

20. The light scanning apparatus according to claim 15, wherein the aperture is arranged between the light source and the rotating polygon mirror, and includes an aperture portion, that transmits the light beam.

21. The light scanning apparatus according to claim 20, wherein
the light beam is configured to be incident to the reflection face of the rotating polygon mirror, in a scanning plane, at a predetermined angle of inclination with respect to an optical axis of the scanning optical system,
the width in the main scanning direction of the aperture portion of the aperture is asymmetry to the optical axis of the first optical system, and
the width from an optical axis of the first optical system to an aperture portion end face of a rotating polygon mirror incidence side is wider than a contrariness side.

22. An image forming apparatus comprising:
the light scanning apparatus described in claim 1; and
an image carrying body in which the light beam deflection-scanned by the light scanning apparatus is focused on a surface to be scanned to form an image.

* * * * *